United States Patent
Homma et al.

(10) Patent No.: US 9,023,547 B2
(45) Date of Patent: May 5, 2015

(54) FUEL CELL COMPRISING SEPARATOR WITH PROTRUSIONS IN ZIGZAG-PATTERN

(75) Inventors: Hiroki Homma, Wako (JP); Tsutomu Takahashi, Wako (JP); Tetsuya Ogawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 546 days.

(21) Appl. No.: 12/993,731

(22) PCT Filed: May 8, 2009

(86) PCT No.: PCT/JP2009/059020
§ 371 (c)(1),
(2), (4) Date: Nov. 19, 2010

(87) PCT Pub. No.: WO2009/142145
PCT Pub. Date: Nov. 26, 2009

(65) Prior Publication Data
US 2011/0076586 A1 Mar. 31, 2011

(30) Foreign Application Priority Data
May 19, 2008 (JP) ................................. 2008-130958

(51) Int. Cl.
*H01M 8/02* (2006.01)
*H01M 8/12* (2006.01)
*H01M 8/24* (2006.01)

(52) U.S. Cl.
CPC .......... *H01M 8/0258* (2013.01); *H01M 8/0254* (2013.01); *H01M 8/2425* (2013.01); *H01M 2008/1293* (2013.01); *Y02E 60/50* (2013.01); *Y02E 60/525* (2013.01)

(58) Field of Classification Search
CPC ............ H10M 8/0247; H10M 8/0254; H10M 8/0258; H10M 8/026; H10M 8/2425; H01M 2008/1293
USPC .................. 429/457, 452, 465, 467, 479, 514
See application file for complete search history.

(56) References Cited

U.S. PATENT DOCUMENTS

| 6,472,094 | B1 | 10/2002 | Nonoyama et al. |
| 7,670,710 | B2 | 3/2010 | Tsunoda |

(Continued)

FOREIGN PATENT DOCUMENTS

| JP | 63-266777 | 11/1988 |
| JP | 2001-185173 | 7/2001 |

(Continued)

OTHER PUBLICATIONS

International Search Report for Application No. PCT/JP2009/059020, dated Sep. 8, 2009.

(Continued)

*Primary Examiner* — Sean P Cullen
(74) *Attorney, Agent, or Firm* — Nelson Mullin Riley & Scarborough LLP; Anthony A. Laurentano

(57) ABSTRACT

A separator of a fuel cell includes a sandwiching section, first and second bridges connected to the sandwiching section, a fuel gas supply section connected to the first bridge and an oxygen-containing gas supply section connected to the second bridge. The sandwiching section sandwiches an electrolyte electrode assembly, and has a fuel gas channel and an oxygen-containing gas channel separately. In the sandwiching section, a plurality of first projections are arranged in a zigzag pattern in a direction in which the first bridge extends, and the first projections at least protrude toward the fuel gas channel to contact an anode.

9 Claims, 31 Drawing Sheets

(56) References Cited

U.S. PATENT DOCUMENTS

| | | | |
|---|---|---|---|
| 8,088,533 B2 | 1/2012 | Yamamura | |
| 2005/0136294 A1* | 6/2005 | Tsunoda | 429/12 |
| 2006/0292432 A1 | 12/2006 | Ogawa et al. | |
| 2007/0160894 A1* | 7/2007 | Park et al. | 429/39 |
| 2007/0172716 A1 | 7/2007 | Frederiksen et al. | |
| 2008/0096085 A1 | 4/2008 | Tsunoda | |
| 2010/0178593 A1 | 7/2010 | Kiyohiro | |

FOREIGN PATENT DOCUMENTS

| | | |
|---|---|---|
| JP | 2002-184422 | 6/2002 |
| JP | 2004-526283 | 8/2004 |
| JP | 2005-183079 | 7/2005 |
| JP | 2005-293877 | 10/2005 |
| JP | 2006-134598 | 5/2006 |
| JP | 2006-222099 | 8/2006 |
| JP | 2008-47413 | 2/2008 |
| WO | 00/03446 A1 | 1/2000 |
| WO | 02/069426 A3 | 9/2002 |

OTHER PUBLICATIONS

Japanese Office Action for Application No. 2008-130958, 4 pages, dated Dec. 4, 2012.

* cited by examiner

⟹ OXYGEN-CONTAINING GAS
⟹ FUEL GAS
⟹ EXHAUST GAS

FUEL CELL COMPRISING SEPARATOR WITH PROTRUSIONS IN ZIGZAG-PATTERN

RELATED APPLICATIONS

This application is a 35 U.S.C. 371 national stage filing of International Application No. PCT/JP2009/059020, filed May 8, 2009, which claims priority to Japanese Patent Application No. 2008-130958 filed on May 19, 2008 in Japan. The contents of the aforementioned applications are hereby incorporated by reference.

TECHNICAL FIELD

The present invention relates to a fuel cell formed by stacking electrolyte electrode assemblies and separators alternately. Each of the electrolyte electrode assembles includes an anode, a cathode, and an electrolyte interposed between the anode and the cathode.

BACKGROUND ART

Typically, solid oxide fuel cells (SOFC) employ an electrolyte of ion-conductive solid oxide such as stabilized zirconia. The electrolyte is interposed between an anode and a cathode to form an electrolyte electrode assembly (MEA). The electrolyte electrode assembly is interposed between a pair of separators (bipolar plates). In use, generally, a predetermined number of the separators and the electrolyte electrode assemblies are stacked together to form a fuel cell stack.

As the structure of the fuel cell of this type, for example, the fuel cell separator structure disclosed in Japanese Laid-Open Patent Publication No. 63-266777 is known. In the separator structure, a corrugated plate formed by corrugating a metal flat plate by plastic forming is used as a separator. The corrugated plate has a plurality of cutouts for connection between both of front and back surfaces of the corrugated plate. The corrugated plate is provided at least on one side of a partition plate, and jointed to the partition plate such that the orientation of corrugation is aligned with the flow direction of the gas. According to the disclosure, in this manner, the manifold structure is simplified, and problems such as the flow failure or clogging, and non-uniform reactant gas concentration in the middle of the gas channel are eliminated.

In a fuel cell separator and a method of producing the fuel cell separator disclosed in International Publication No. WO 00/03446, a separator substrate 1 in the form of a flat plate 3, and a large number of projections 2 on the separator substrate 1 are provided, as shown in FIG. 30. The projections 2 have a circular truncated cone shape, and are arranged in rows and columns in a zigzag pattern, and spaced from each other at certain intervals. Gas channel differences are formed between the projections 2.

Further, in a fuel cell separator disclosed in Japanese Laid-Open Patent Publication No. 2005-293877, a metal substrate 1a is provided, as shown in FIG. 31. A plurality of metal covers 4a are formed on a front surface 2a of the metal substrate 1a, and a plurality of metal covers 5a are formed on a back surface 3a of the metal substrate 1a. The metal covers 4a and the metal covers 5a are spaced from each other, and aligned at equal intervals on the front surface 2a and the back surface 3a, or distributed at alternate positions on the front surface 2a and the back surface 3a.

However, in Japanese Laid-Open Patent Publication No. 63-266777, since the cutouts are formed in the corrugated plate, the contact area between the separator and the MEA tends to be small. Therefore, the reactant gas tends to flow through without being consumed, and the power generation efficiency may be lowered undesirably. Further, the strength of the separator itself is lowered. Warpage or the like occurs easily in the separator, and the separator is deformed.

Further, in International Publication No. WO 00/03446, though the projections 2 are arranged in a zigzag pattern on the separator substrate 1, due to the structure of the fuel cell as a whole, it may not be possible to effectively increase the contract area with the MEA. Thus, improvement in the power generation efficiency cannot be achieved. Further, it may not be possible to sufficiently suppress warpage of the separator and deformation of the separator.

Further, in Japanese Laid-Open Patent Publication No. 2005-293877, the metal covers 4a are provided in a matrix pattern on the front surface 2a of the metal substrate 1a, and the metal covers 5a are provided in a matrix pattern on the back surface 3a of the metal substrate 1a. Therefore, it is difficult to effectively increase the contact area with the MEA. Further, warpage and deformation of the separator cannot be suppressed, and the reactant gas may flow through without being consumed.

SUMMARY OF INVENTION

The present invention solves the problems of this type, and an object of the present invention is to provide a fuel cell in which the desired strength of the separator itself is effectively maintained, the contract area between the separator and the electrolyte electrode assembly is increased, and flowing of the reactant gas without being used is suppressed to achieve improvement in the power generation efficiency.

The present invention relates to a fuel cell formed by stacking electrolyte electrode assemblies and separators alternately. The electrolyte electrode assembly includes an anode, a cathode, and an electrolyte interposed between the anode and the cathode.

Each of the separators includes a sandwiching section, a bridge, and a reactant gas supply section. The sandwiching sections sandwich the electrolyte electrode assembly. Each of the sandwiching sections has a fuel gas channel for supplying a fuel gas along an electrode surface of the anode provided on one surface of the separator and an oxygen-containing gas channel for supplying an oxygen-containing gas along an electrode surface of the cathode provided on the other surface of the separator, separately.

The bridge is connected to the sandwiching section. The bridge has a reactant gas supply channel for supplying the fuel gas to the fuel gas channel or supplying the oxygen-containing gas to the oxygen-containing gas channel. The reactant gas supply section is connected to the bridge. A reactant gas supply passage for supplying the fuel gas or the oxygen-containing gas to the reactant gas supply channel extends through the reactant gas supply section in the stacking direction.

In the sandwiching section, a plurality of projections are arranged in a zigzag pattern in a direction in which the bridge extends, and the projections at least protrude toward the fuel gas channel to contact the anode or protrude toward the oxygen-containing gas channel to contact the cathode.

According to another aspect of the present invention, in the sandwiching section, a plurality of projections are arranged in a zigzag pattern in a direction in which the reactant gas supply channel extends, and the projections at least protrude toward the fuel gas channel to contact the anode or protrude toward the oxygen-containing gas channel to contact the cathode.

According to still another aspect of the present invention, in the sandwiching section, a plurality of projections are arranged in a zigzag pattern in a direction of a straight line connecting the center of the reactant gas supply section and the center of gravity of the sandwiching section, and the projections at least protrude toward the fuel gas channel to contact the anode or protrude toward the oxygen-containing gas channel to contact the cathode.

In the present invention, in the sandwiching section, a large number of projections are arranged efficiently in comparison with the structure where projections are arranged in a matrix pattern. Thus, with the simple structure, warpage of the separator is suppressed, and the strength against deformation is improved, and improvement in the quality is achieved. Further, since the contact area of the sandwiching section with the electrolyte electrode assembly is increased, the IR losses are reduced, and improvement in the power generation efficiency is achieved. Moreover, since the projections are provided close to each other, flowing of the reactant gas without being used is suppressed, also resulting in the improved power generation efficiency.

The IR losses are also referred to as the ohm losses of the fuel cell, and include electrical resistance, and internal resistance and contact resistance in the fuel cell. The IR losses decrease the voltage of the fuel cell (resistance overpotential). The losses concerning the fuel cell include activation overpotential and concentration overpotential in addition to the resistance overpotential.

DESCRIPTION OF EMBODIMENTS

Figure 1:
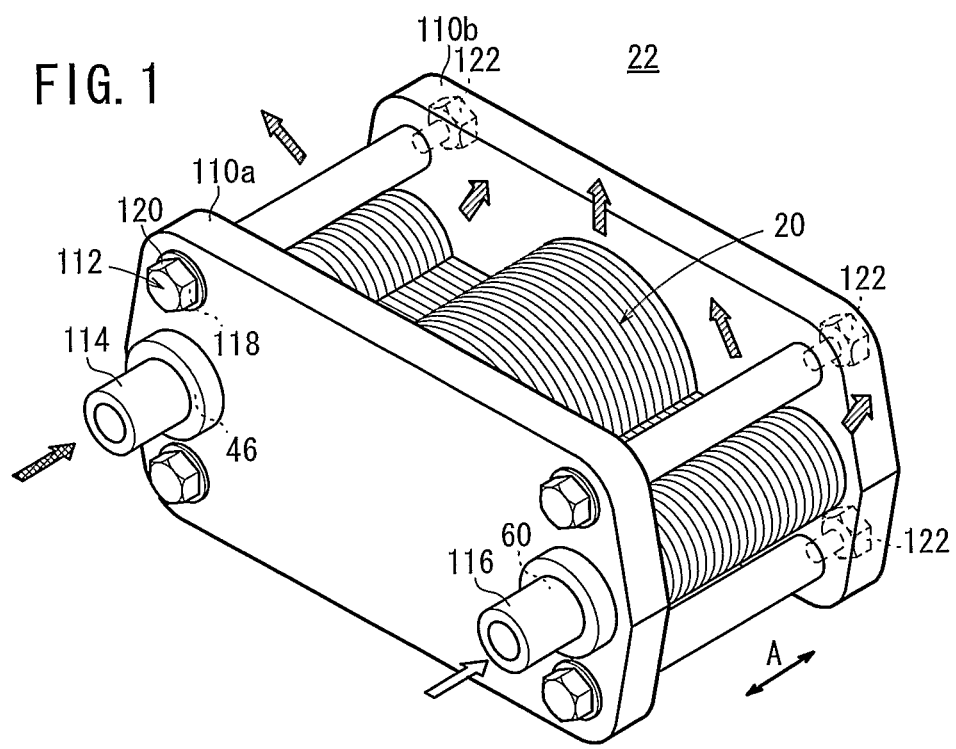
FIG. 1 is a perspective view schematically showing a fuel cell stack formed by stacking a plurality of fuel cells according to a first embodiment of the present invention.

FIG. 1 is a perspective view schematically showing a fuel cell stack 22 formed by stacking a plurality of fuel cells 20 according to a first embodiment of the present invention in a direction indicated by an arrow A.

Figure 2:
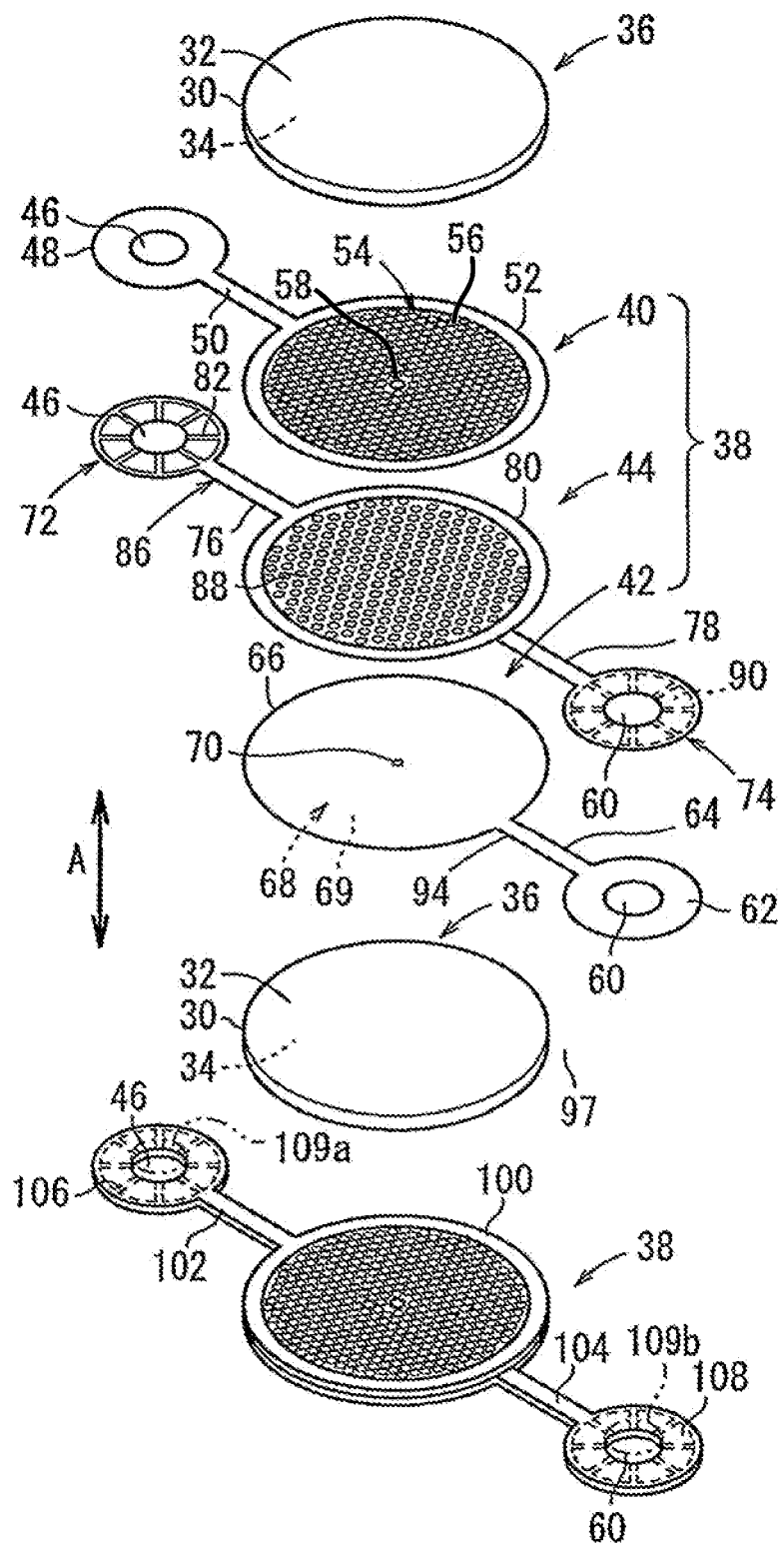
FIG. 2 is an exploded perspective view showing the fuel cell.
Figure 3:
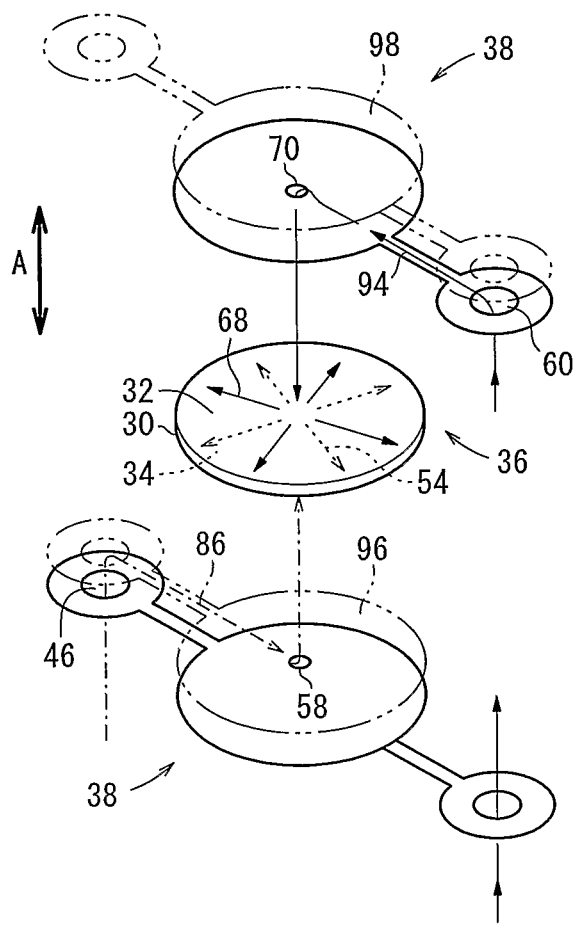
FIG. 3 is a partial exploded perspective view showing gas flows in the fuel cell.

The fuel cell 20 is a solid oxide fuel cell (SOFC) used in various applications, including stationary and mobile applications. For example, the fuel cell 20 is mounted on a vehicle. As shown in FIGS. 2 and 3, the fuel cell 20 includes an electrolyte electrode assembly 36. The electrolyte electrode assembly 36 includes a cathode 32, an anode 34, and an electrolyte (electrolyte plate) 30 interposed between the cathode 32 and the anode 34. For example, the electrolyte 30 is made of ion-conductive solid oxide such as stabilized zirconia. The electrolyte electrode assembly 36 has a circular disk shape.

The fuel cell 20 is formed by sandwiching a single electrolyte electrode assembly 36 between a pair of separators 38 according to the first embodiment. The separator 38 includes first and second plates 40, 42 and a third plate 44 interposed between the first and second plates 40, 42. For example, the first to third plates 40, 42, 44 are metal plates of, e.g., stainless alloy. For example, the first to third plates 40, 42, 44 are joined to each other by diffusion bonding, laser welding, or brazing.

As shown in FIG. 2, the first plate 40 includes a first fuel gas supply section 48, and a fuel gas supply passage 46 for supplying a fuel gas in the stacking direction indicated by the arrow A extends through the first fuel gas supply section 48. The first fuel gas supply section 48 is integral with a first sandwiching section 52 having a relatively large diameter through a narrow first portion 50 of a first bridge 102. The first sandwiching section 52 and the anode 34 of the electrolyte electrode assembly 36 have substantially the same size.

The first sandwiching section 52 has a fuel gas channel 54, and a large number of first projections 56 formed by etching or formed under pressure, on a surface which contacts the anode 34. The first projections 56 form a current collector.

Figure 4:
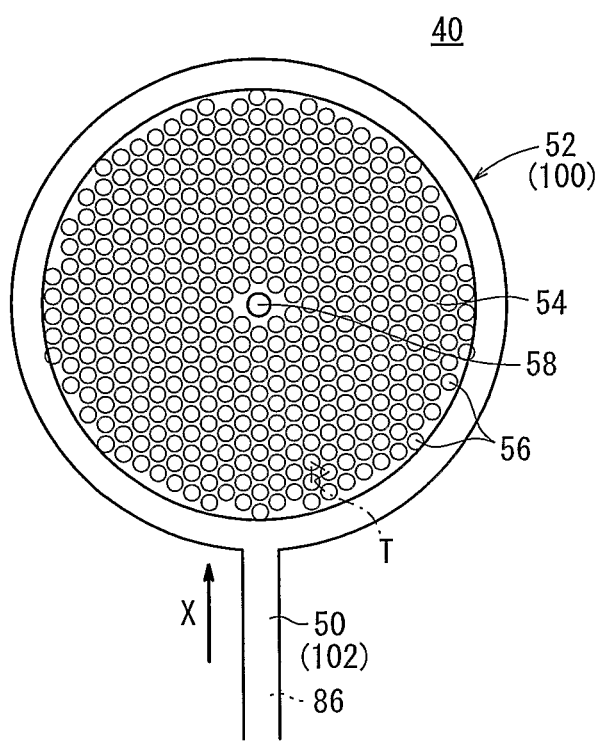
FIG. 4 is an enlarged view showing main components of a first plate of the fuel cell.

As shown in FIG. 4, the first projections 56 are arranged in a zigzag pattern in at least any (in the first embodiment, all) of a direction in which the first portion 50 of the first bridge 102 extends (in a direction indicated by an arrow X), a direction in which a fuel gas supply channel 86 as described later extends, and a direction of a straight line connecting the center of the first fuel gas supply section 48 (fuel gas supply section 106 as described later) and the center of gravity (or the center) of the first sandwiching section 52 (sandwiching section 100 described later). Among the first projections 56, adjacent three first projections 56 are arranged at respective vertices of a virtual equilateral triangle T.

A fuel gas inlet 58 is formed at the center of the first sandwiching section 52 for supplying the fuel gas toward a substantially central region of the anode 34.

As shown in FIG. 2, the second plate 42 has a first oxygen-containing gas supply section 62, and an oxygen-containing gas supply passage 60 for supplying an oxygen-containing gas in the stacking direction indicated by the arrow A extends through the first oxygen-containing gas supply section 62. The first oxygen-containing gas supply section 62 is integral with a second sandwiching section 66 having a relatively large diameter through a narrow first portion 64 of a second bridge 104.

The second sandwiching section 66 has an oxygen-containing gas channel 68, and a large number of second projections 69 formed by etching or formed under pressure, on a surface which contacts the cathode 32. The second projections 69 form a current collector.

Figure 5:
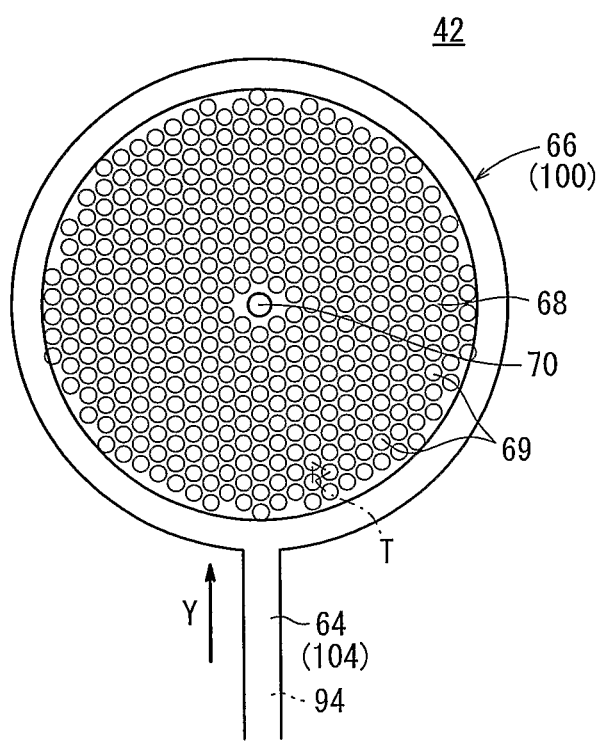
FIG. 5 is an enlarged view showing main components of a second plate of the fuel cell.

As shown in FIG. 5, the second projections 69 are arranged in a zigzag pattern in at least any (in the first embodiment, all) of a direction in which the first portion 64 of the second bridge 104 as described later extends (in a direction indicated by an arrow Y), a direction in which an oxygen-containing gas supply channel 94 as described later extends, and a direction of a straight line connecting the center of the first oxygen-containing gas supply section 62 (oxygen-containing gas supply section 108 as described later) and the center of gravity (or the center) of the second sandwiching section 66 (sandwiching section 100 described later). Among the second projections 69, adjacent three second projections 69 are arranged at respective vertices of a virtual equilateral triangle T. The number of the first projections 56 and the second projections 69 arranged in the same phase with each other (at the same positions) is larger than the number of the first projections 56 and the second projections 69 arranged in different phases.

An oxygen-containing gas inlet 70 is formed at the center of the second sandwiching section 66 for supplying the oxygen-containing gas toward a substantially central region of the cathode 32.

As shown in FIG. 2, the third plate 44 has a second fuel gas supply section 72 and a second oxygen-containing gas supply section 74. The fuel gas supply passage 46 extends through the second fuel gas supply section 72, and the oxygen-containing gas supply passage 60 extends through the second oxygen-containing gas supply section 74. The second fuel gas supply section 72 and the second oxygen-containing gas supply section 74 are integral with a third sandwiching section 80 having a relatively large diameter through narrow second portion 76 of the first bridge 102 and second portion 78 of the second bridge 104. The diameter of the third sandwiching section 80 is the same as the diameters of the first and second sandwiching sections 52, 66.

A channel 82 including a plurality of slits is formed on the second fuel gas supply section 72. The channel 82 is connected to the fuel gas supply passage 46. The slits of the channel 82 are formed radially on a surface of the third plate 44 facing the first plate 40. A fuel gas supply channel 86 connected to the fuel gas supply passage 46 through the channel 82 is formed in the second portion 76 of the first bridge 102 and the surface of the third sandwiching section 80. Third projections 88 form part of the fuel gas supply channel 86.

A channel 90 including a plurality of slits is formed on the second oxygen-containing gas supply section 74. The channel 90 is connected to the oxygen-containing gas supply passage 60. The slits of the channel 90 are formed radially on a surface of the third plate 44 facing the second plate 42. An oxygen-containing gas supply channel 94 connected to the oxygen-containing gas supply passage 60 through the channel 90 is formed in the third sandwiching section 80. The oxygen-containing gas supply channel 94 is closed by outer peripheral portion of the third sandwiching section 80.

The first plate 40 is joined to one surface of the third plate 44 by brazing, laser welding, or diffusion bonding to form the fuel gas supply channel 86 connected to the fuel gas supply passage 46, between the first and third plates 40, 44. The fuel gas supply channel 86 is provided between the first and third sandwiching sections 52, 80, over the electrode surface of the anode 34. The first sandwiching section 52 is provided between the fuel gas supply channel 86 and the anode 34. When the fuel gas is supplied to the fuel gas supply channel 86, the first sandwiching section 52 tightly contacts the anode 34 under pressure. That is, the fuel gas supply channel 86 forms a fuel gas pressure chamber 96 (see FIG. 6). An exhaust gas channel 97 for discharging the fuel gas and the oxygen-containing gas used in the power generation reaction is provided around the electrolyte electrode assembly 36.

The second plate 42 is joined to the third plate 44 by brazing, laser welding, or diffusion bonding to form the oxygen-containing gas supply channel 94 connected to the oxygen-containing gas supply passage 60, between the second and third plates 42, 44. The oxygen-containing gas supply channel 94 is provided between the second and third sandwiching sections 66, 80, over the electrode surface of the cathode 32. The second sandwiching section 66 is provided between the oxygen-containing gas supply channel 94 and the cathode 32. When the oxygen-containing gas is supplied to the oxygen-containing gas supply channel 94, the second sandwiching section 66 tightly contacts the cathode 32 under pressure. That is, the oxygen-containing gas supply channel 94 forms an oxygen-containing gas pressure chamber 98 (see FIG. 6).

In the separator 38, the first sandwiching section 52 of the first plate 40, the second sandwiching section 66 of the second plate 42, and the third sandwiching section 80 of the third plate 44 are joined together to form a sandwiching section 100 having a circular disk shape. The sandwiching section 100 is connected to a first bridge 102 formed by joining the first portion 50 of the first bridge 102 and the second portion 76 of the first bridge 102 together, and a second bridge 104 formed by joining a first portion 64 of the second bridge 104 and a second portion 78 of the second bridge 104 together.

The first bridge 102 is connected to the fuel gas supply section 106 formed by joining the first fuel gas supply section 48 and the second fuel gas supply section 72. The second bridge 104 is connected to the oxygen-containing gas supply section 108 formed by joining the first oxygen-containing gas supply section 62 and the second oxygen-containing gas supply section 74.

As shown in FIG. 2, an insulating seal 109a for sealing the fuel gas supply passage 46, and an insulating seal 109b for sealing the oxygen-containing gas supply passage 60 are provided between the separators 38. For example, crustal component material such as mica material and ceramic material, glass material, and composite material of clay and plastic may be used for the insulating seals 109a, 109b.

As shown in FIG. 1, the fuel cell stack 22 includes a plurality of fuel cells 20 stacked together, and end plates 110a, 110b provided at opposite ends in the stacking direction. The end plate 110a or the end plate 110b is electrically insulated from tightening means 112. The end plate 110a is connected to a first pipe 114 connected to the fuel gas supply passage 46 of the fuel cells 20, and a second pipe 116 connected to the oxygen-containing gas supply passage 60 of the fuel cells 20. The tightening means 112 are provided at positions adjacent to the fuel gas supply passage 46 and the oxygen-containing gas supply passage 60, and spaced from the electrolyte electrode assemblies 36. The tightening means 112 applies a tightening load to the electrolyte electrode assemblies 36 and the separators 38 stacked in the direction indicated by the arrow A.

The tightening means 112 include bolt holes 118 formed in the end plates 110a, 110b, at positions on both sides of the fuel gas supply passage 46 and on both sides of the oxygen-containing gas supply passage 60. Tightening bolts 120 are inserted into the bolt holes 118, and tip ends of the tightening bolts 120 are screwed into nuts 122 to tighten components of the fuel cell stack 22 together. The sandwiching section is connected to the fuel gas supply section 106 and the oxygen-containing gas supply section 108 through the first bridge 102 and the second bridge 104. In the structure, when the tightening load for sealing is applied to positions near the fuel gas supply section 106 and the oxygen-containing gas supply section 108 by the tightening means 112, no excessive tightening load is applied to the electrolyte electrode assembly 36 sandwiched between the sandwiching sections 100.

Operation of the fuel cell stack 22 will be described above.

As shown in FIG. 1, the fuel gas such as a hydrogen-containing gas is supplied from the first pipe 114 connected to the end plate 110a and the oxygen-containing gas (also referred to as the air hereinafter) is supplied from the second pipe 116 connected to the end plate 110a. The fuel gas flows into the fuel gas supply passage 46, and the oxygen-containing gas flows into the oxygen-containing gas supply passage 60.

Figure 6:
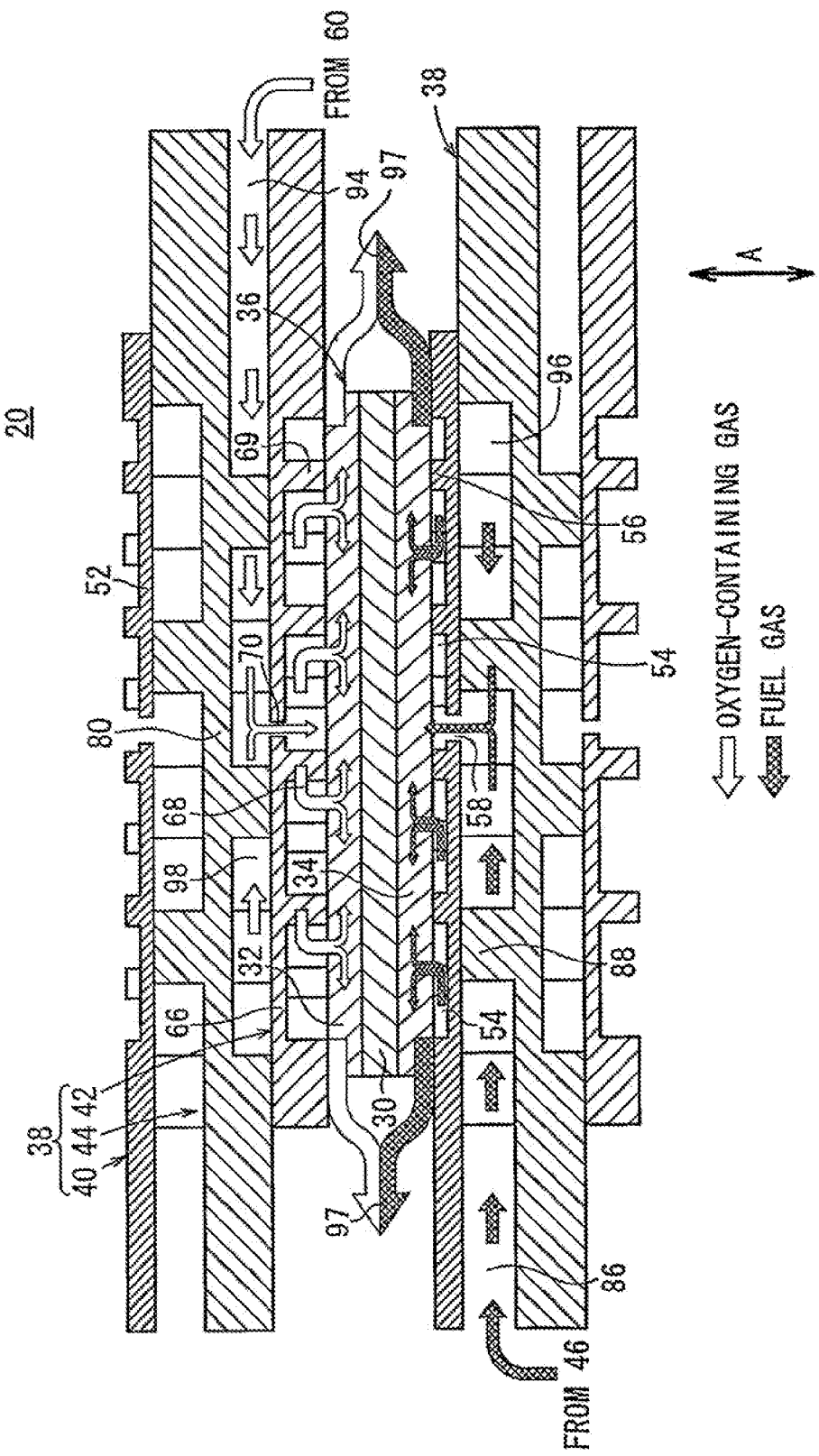
FIG. 6 is a cross sectional view schematically showing operation of the fuel cell.

As shown in FIG. 6, the fuel gas supplied to the fuel gas supply passage 46 flows in the stacking direction indicated by the arrow A, and the fuel gas is supplied to the fuel gas supply channel 86 in the separator 38 of each fuel cell 20. The fuel gas flows along the fuel gas supply channel 86 into the fuel gas pressure chamber 96 formed between the first and third sandwiching sections 52, 80. The fuel gas moves between the third projections 88, and flows into the fuel gas inlet 58 formed at the center of the first sandwiching section 52.

The fuel gas inlet 58 is provided at a position corresponding to the central position of the anode 34 in each of the electrolyte electrode assemblies 36. Therefore, the fuel gas from the fuel gas inlet 58 is supplied to the fuel gas channel 54, and flows from the central region of the anode 34 toward the outer circumferential region of the anode 34.

The oxygen-containing gas supplied to the oxygen-containing gas supply passage 60 flows along the oxygen-containing gas supply channel 94 in the separator 38, and the oxygen-containing gas is supplied into the oxygen-containing gas pressure chamber 98 formed between the second and third sandwiching sections 66, 80. Then, the oxygen-containing gas flows into the oxygen-containing gas inlet 70 formed at the center of the second sandwiching section 66.

The oxygen-containing gas inlet 70 is provided at a position corresponding to the central position of the cathode 32 in each of the electrolyte electrode assemblies 36. Therefore, the oxygen-containing gas from the oxygen-containing gas inlet 70 is supplied to the oxygen-containing gas channel 68, and flows from the central region of the cathode 32 toward the outer circumferential region of the cathode 32.

Thus, in each of the electrolyte electrode assemblies 36, the fuel gas is supplied from the central region of the anode 34 to the outer circumferential region of the anode 34, and the oxygen-containing gas is supplied from the central region of the cathode 32 to the outer circumferential region of the cathode 32 for generating electricity. The fuel gas and the oxygen-containing gas used in the power generation are discharged as the exhaust gas from the outer circumferential region of the sandwiching section 100.

In the first embodiment, as shown in FIGS. 2 and 4, on the surface of the sandwiching section 100 (first sandwiching section 52), the first projections 56 are arranged in a zigzag pattern in the direction in which the first bridge 102 extends (direction in which the fuel gas supply channel 86 extends, and the direction of a straight line connecting the center of the fuel gas supply section 106 and the center of gravity (or the center) of the sandwiching section 100), and the first projections 56 contact the anode 34.

Figure 7:
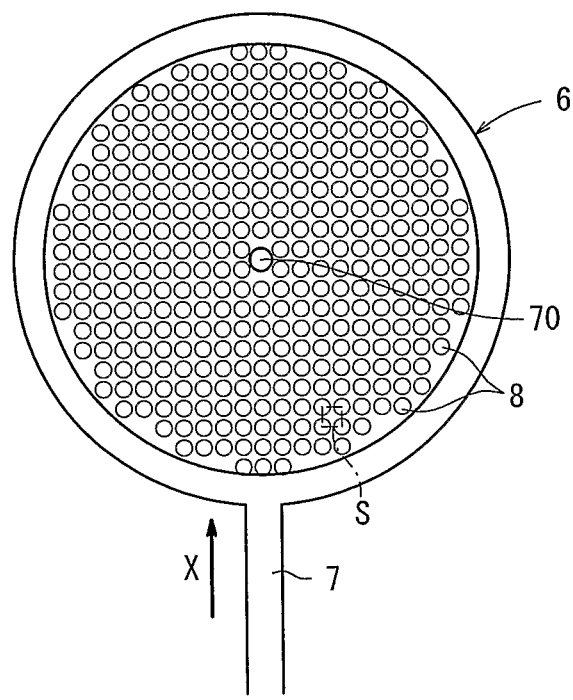
FIG. 7 is a view showing a sandwiching section in a comparative example.

In a sandwiching section 6 shown as a comparative example in FIG. 7, first projections 8 are arranged in a matrix pattern in a direction indicated by an arrow X in which a bridge portion 7 extends. Among the first projections 8, adjacent four first projections 8 are arranged at respective vertices of a virtual square S.

A comparison of the first projections 56 of the first embodiment and the first projections 8 of the comparative example shows that the number of the first projections 56 is larger than the number of the first projections 8 by about 15% per unit area. Therefore, as the number of the first projections 56 increases, power generation performance is increased in each of the fuel cells 20.

Figure 8:
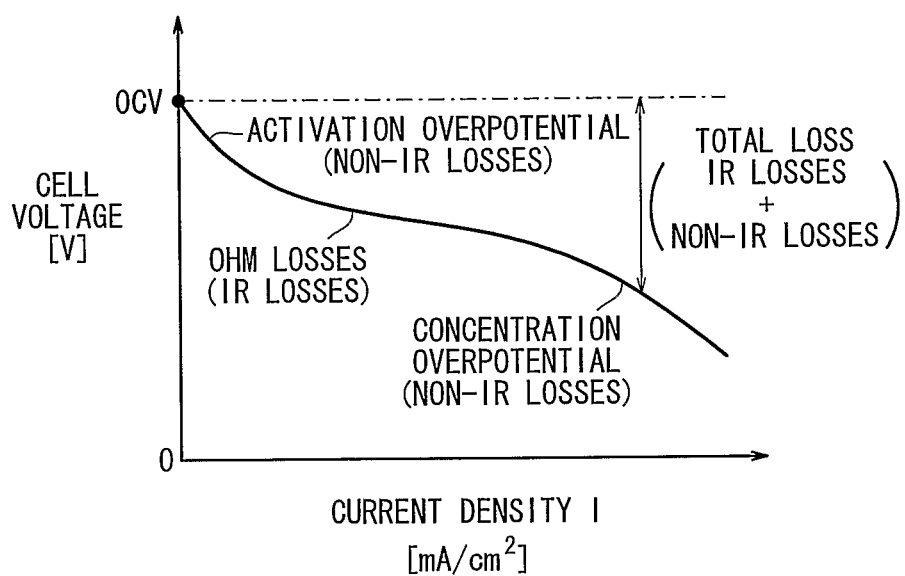
FIG. 8 is an explanatory view showing I-V characteristics of the fuel cell.

That is, in the I-V (current-voltage) curve of the fuel cell 20 shown in FIG. 8, by the increase in the current density (I), the voltage losses from the theoretical electromotive force (OCV) occur. For example, the losses occur due to activation overpotential, ohm losses (IR losses), and concentration overpotential.

Figure 9:
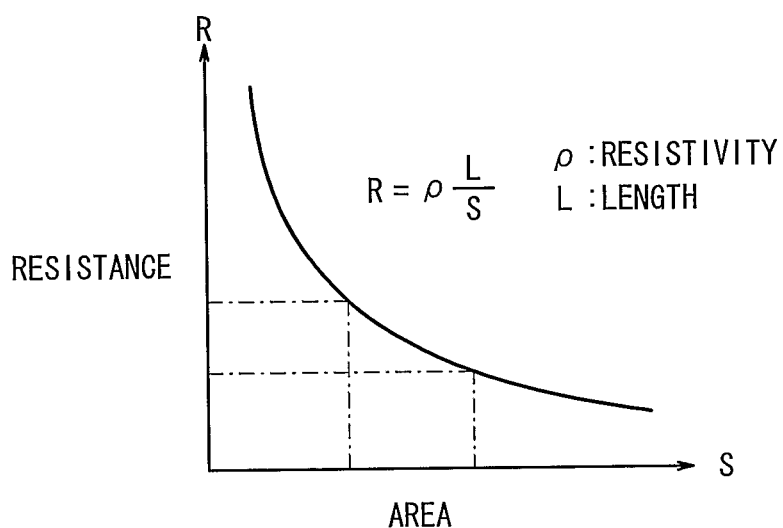
FIG. 9 is a view showing the relationship between the metal resistance and the contact area.

The ohm losses include metal resistance, contact resistance between conductors, and internal resistance in the electrolyte electrode assembly. As shown in FIG. 9, the metal resistance is decreased as the contact area with the anode 34 increases ($R=\rho \times L/S$).

Thus, in the first embodiment, since the number of the first projections 56 is larger than the first projections 8 by about 15% per unit area, the contact area S with the anode 34 is increased, and the metal resistance R is reduced, e.g., by about 13%. By the reduction in the metal resistance, the ohm losses are reduced. As a result, improvement in the performance of the fuel cell 20 is achieved by several %, e.g., about 5%.

Further, a large number of the first projections 56 are arranged efficiently in comparison with the structure where the first projections 8 are arranged in a matrix pattern. Thus, with the simple structure, warpage of the separator 38 is suppressed, and the strength against deformation (e.g., warpage, compression, and decompression) is improved, and improvement in the quality is achieved.

Further, since the first projections 56 are provided close to each other, the fuel gas in the fuel gas channel 54 formed by the first projections 56 is prevented from flowing through without being used, and improvement in the power generation efficiency is achieved.

Further, since the first projections 56 are arranged in a zigzag pattern in the direction of a straight line connecting the center of the fuel gas supply section 106 and the center of the sandwiching section 100, a large number of the first projections 56 are arranged in the surface of the sandwiching section 100, in particular, having a circular shape. In the case where the sandwiching section 100 does not have a circular shape, and has a fan shape, a trapezoidal shape or the like, the first projections 56 are arranged in a zigzag pattern along a straight line connecting the center of gravity of the sandwiching section 100 and the center of the fuel gas supply section 106. In this manner, the same advantages as in the case of the sandwiching section 100 having a circular shape are obtained.

Further, among the first projections 56, adjacent three first projections 56 are arranged at respective vertices of a virtual equilateral triangle T (see FIG. 4). In the structure, since the adjacent three first projections 56 have truss structure, high strength is achieved. With the simple structure, the separator 38 is not deformed easily, and improvement in the quality is achieved.

In the sandwiching section 100, as in the case of the first projections 56, the second projections 69 arranged in a zigzag pattern are provided. The same advantages as in the case of the first projections 56 are achieved by the second projections 69.

Further, the first projections 56 and the second projections 69 are provided on both surfaces of the sandwiching section 100. The number of the first projections 56 and the second projections 69 arranged in the same phase with each other (at the same positions) is larger than the number of the first projections 56 and the second projections 69 arranged in different phases. In the structure, the first projections 56 contact the anode 34, and the second projections 69 contact the cathode 32. Thus, current collection can be performed suitably.

Further, the load in the stacking direction is reliably transmitted between the first projections 56 and the second projections 69. Since the separator 38 tightly contacts the electrolyte electrode assembly 36, current collection can be performed even further suitably, and improvement in the power generation efficiency is achieved.

The fuel cell 20 is a solid oxide fuel cell. Therefore, the thermal influence of the fuel cell 20 operated at high temperature is minimized. With the simple structure, warpage of the sandwiching section 100 is suppressed. The separator 38 is not deformed easily, and improvement in the quality is achieved.

Figure 10:
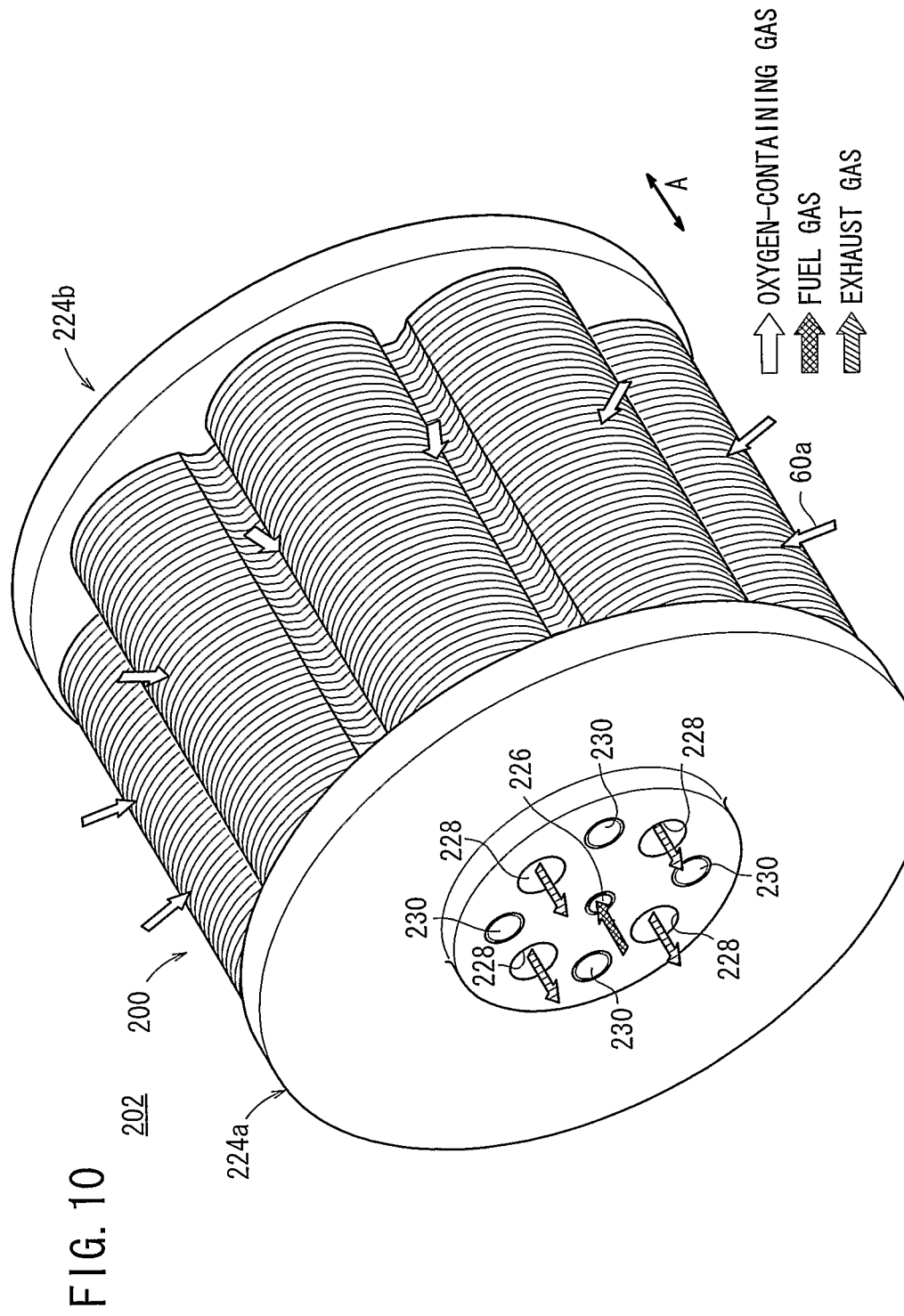
FIG. 10 is a perspective view schematically showing a fuel cell stack formed by stacking fuel cells according to a second embodiment of the present invention.

FIG. 10 is a perspective view schematically showing a fuel cell stack 202 formed by stacking fuel cells 200 according to a second embodiment of the present invention. The constituent elements that are identical to those of the fuel cell 20 according to the first embodiment are labeled with the same reference numeral, and description thereof will be omitted. Also in third to seventh embodiments as described later, the constituent elements that are identical to those of the fuel cell 20 according to the first embodiment are labeled with the same reference numeral, and description thereof will be omitted.

Figure 11:
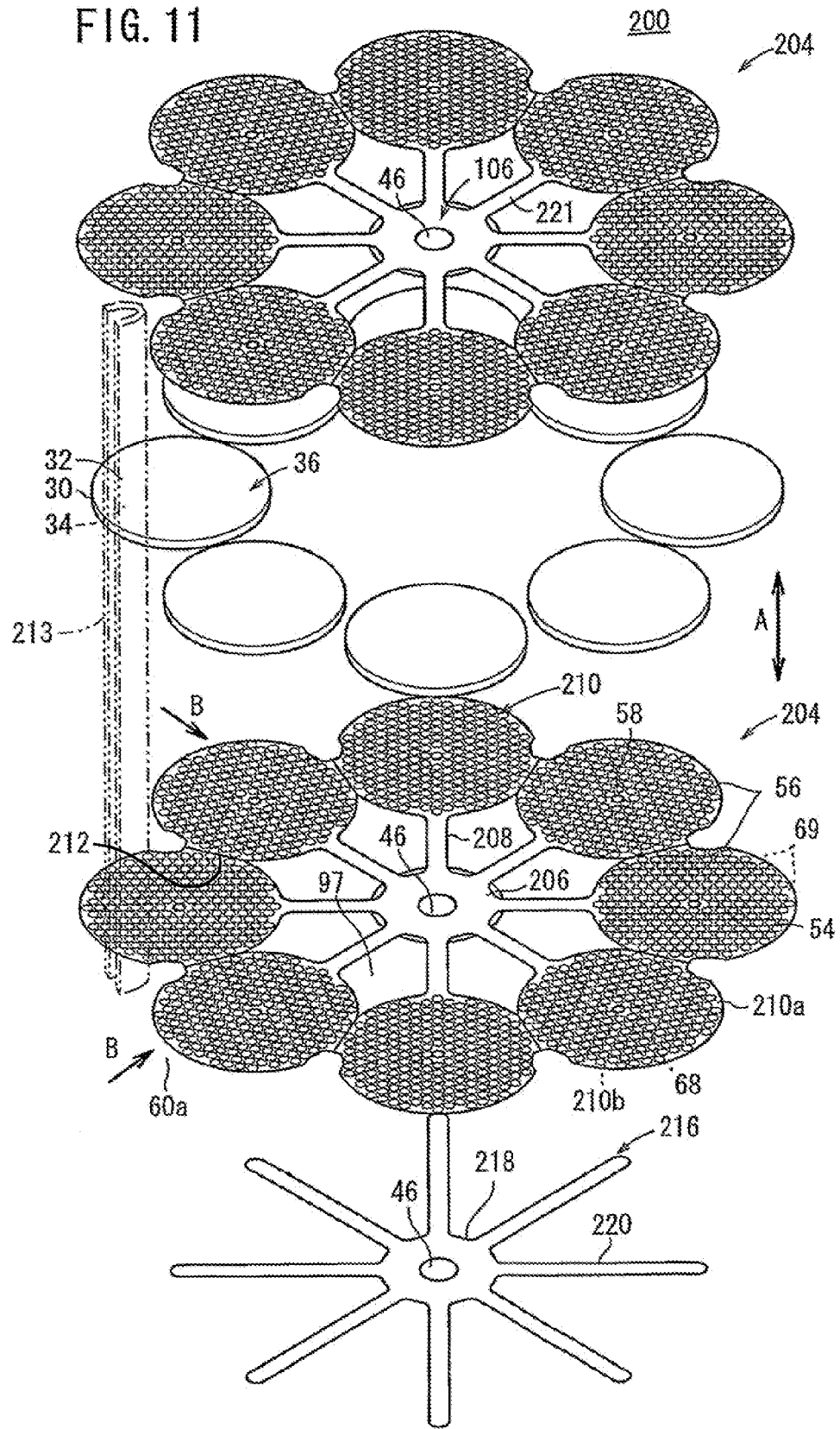
FIG. 11 is an exploded perspective view showing the fuel cell.
Figure 12:
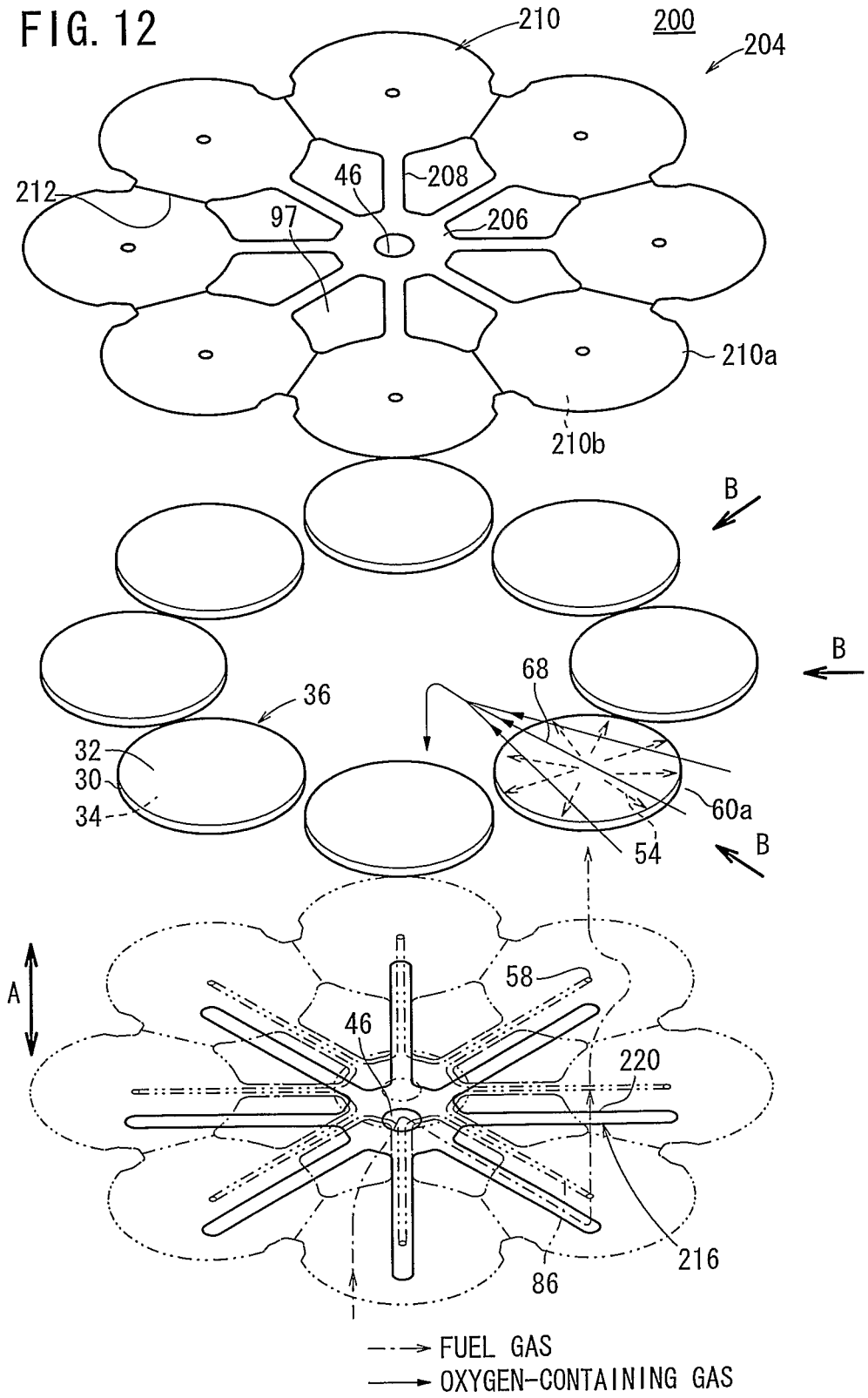
FIG. 12 is a partial exploded perspective view showing gas flows in the fuel cell.

As shown in FIGS. 11 and 12, a plurality of, e.g., eight electrolyte electrode assemblies 36 are sandwiched between a pair of separators 204 to form the fuel cell 200. The eight electrolyte electrode assemblies 36 are aligned in a circle around a fuel gas supply passage 46 extending through the center of the separators 204.

For example, each of the separators 204 is a metal plate. A first fuel gas supply section 206 is provided at the central region of the separator 204, and the fuel gas supply passage 46 extends through the first fuel gas supply section 206. Each of the bridge portions 208 is integral with sandwiching sections 210 each having a circular disk shape. The bridge portions 208 extend radially outwardly from the first fuel gas supply section 206.

The sandwiching section 210 and the electrolyte electrode assembly 36 have substantially the same size. A fuel gas inlet 58 for supplying the fuel gas is formed at the center of the sandwiching section 210, or at an upstream position deviated from the center of the electrolyte electrode assembly 36 in the flow direction of the oxygen-containing gas. The adjacent sandwiching sections 210 are separated from each by a cutout 212.

As necessary, baffle members 213 are provided outside the respective sandwiching sections 210 for preventing entry of the oxygen-containing gas into the oxygen-containing gas channel 68 in a direction which is different from the flow direction in the oxygen-containing gas channel 68 indicated by the arrow B.

Each of the sandwiching sections 210 has a plurality of first projections 56 on its surface 210a which contacts the anode 34. The first projections 56 form the fuel gas channel 54 for supplying the fuel gas along an electrode surface of the anode 34. Each of the sandwiching sections 210 has a plurality of second projections 69 on its surface which contacts the cathode 32. The second projections 69 form the oxygen-containing gas channel 68 for supplying the oxygen-containing gas along an electrode surface of the cathode 32. As in the case of the first embodiment, the first projections 56 and the second projections 69 are arranged in a zigzag pattern.

A channel lid member 216 is fixed to a surface of the separator 204 facing the cathode 32, e.g., by brazing, laser welding, or diffusion bonding. A second fuel gas supply section 218 is formed at the center of the channel lid member 216, and the fuel gas supply passage 46 extends through the second fuel gas supply section 218. Eight bridge portions 220 extend radially from the second fuel gas supply section 218. Each of the bridge portions 220 is fixed to the separator 204, from the bridge portion 208 to the surface of the sandwiching section 210, covering the fuel gas inlet 58. The bridge portion 208 and the bridge portion 220 are joined together to form a bridge 221.

Figure 13:
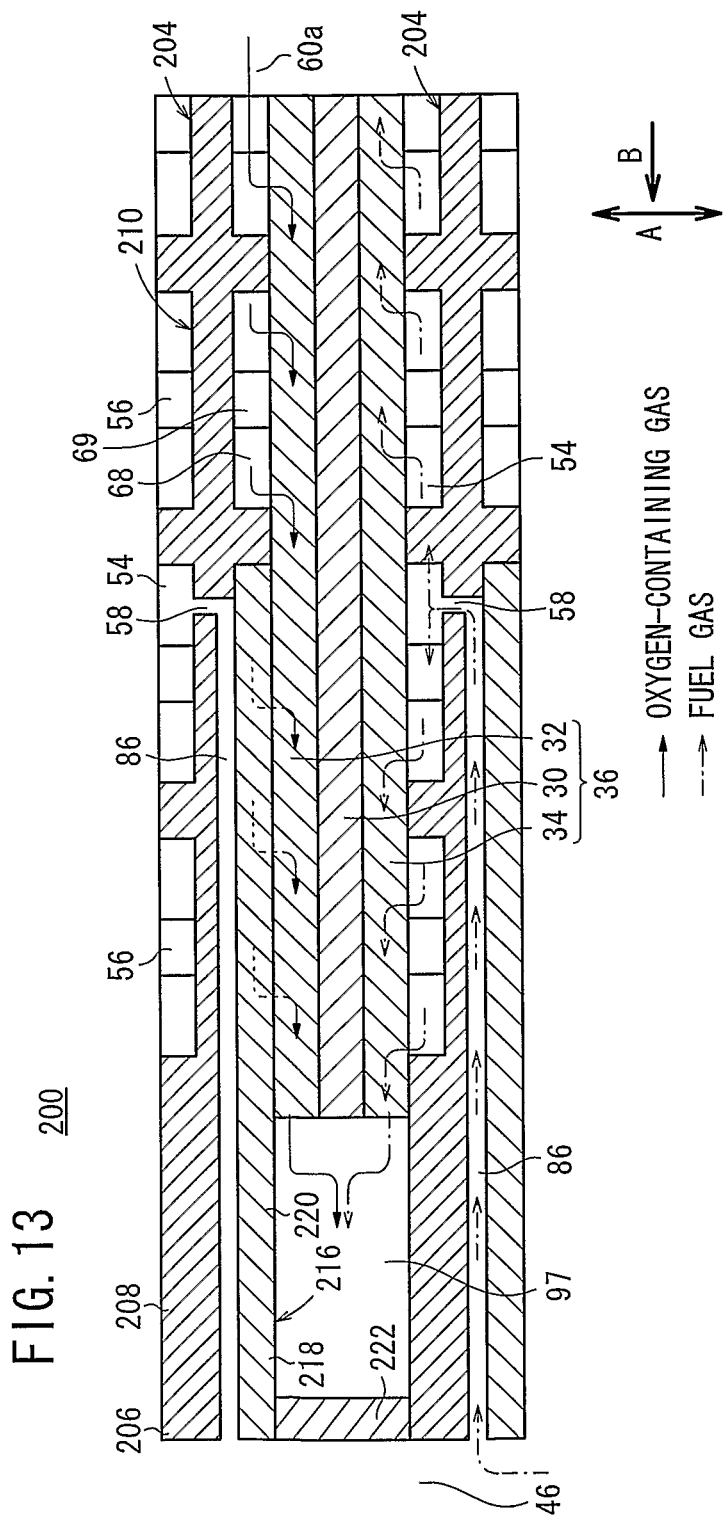
FIG. 13 is cross sectional view schematically showing operation of the fuel cell.

As shown in FIG. 13, an insulating seal 222 for sealing the fuel gas supply passage 46 is provided in each space between the separators 204. In the fuel cell 200, an oxygen-containing gas supply passage 60a is formed around the sandwiching sections 210, and an exhaust gas channel 97 is formed around a first fuel gas supply section 206.

As shown in FIG. 10, the fuel cell stack 202 includes end plates 224a, 224b provided at opposite ends of the fuel cells 200 in the stacking direction. The end plate 224a has a substantially circular disk shape. A hole 226 corresponding to the fuel gas supply passage 46 is provided at the center of the end plates 224a. A plurality of holes 228 corresponding to the exhaust gas channel 97 is provided around the hole 226. Components between the end plates 224a, 224b are tightened together in the direction indicated by the arrow A by bolts (not shown) screwed into the screw holes 230.

Operation of the fuel cell stack 202 will be described below.

As shown in FIG. 10, the fuel gas is supplied from the hole 226 of the end plate 224a, and the oxygen-containing gas is supplied from oxygen-containing gas supply passage 60a provided around the fuel cell 200.

As shown in FIG. 13, the fuel gas flows from the first fuel gas supply section 206 along the fuel gas supply channel 86 between the first and bridge portions 208, 220. Then, the fuel gas flows through the fuel gas inlet 58 of the sandwiching section 210 into the fuel gas channel 54 formed by the first projections 56. The fuel gas inlet 58 is provided at a position corresponding substantially to the central position of the anode 34 of each electrolyte electrode assembly 36. Thus, the fuel gas is supplied from the fuel gas inlet 58 to the anode 34, and flows along the fuel gas channel 54 from substantially the central region to the outer circumferential region of the anode 34.

The oxygen-containing gas flows into the space between the outer circumferential edge of the electrolyte electrode assembly 36 and the outer circumferential edge of the sandwiching section 210 in the direction indicated by the arrow B, and flows toward the oxygen-containing gas channel 68 formed by the second projections 69. In the oxygen-containing gas channel 68, the oxygen-containing gas flows from the outer circumferential edge (outer circumferential edge of the separator 204) to the inner circumferential edge (center of the separator 204) of, i.e., from one end to the other end of the cathode 32 of the electrolyte electrode assembly 36.

Thus, in each of the electrolyte electrode assemblies 36, the fuel gas flows from the center to the outer circumferential side on the electrode surface of the anode 34, and the oxygen-containing gas flows in one direction indicated by the arrow B on the electrode surface of the cathode 32. At this time, oxygen ions flow through the electrolyte 30 toward the anode 34 for generating electricity by electrochemical reactions. The exhaust gas discharged from the outer circumferential region of each of the electrolyte electrode assemblies 36 flows through the exhaust gas channel 97 in the stacking direction, and is discharged from the fuel cell stack 202.

In the second embodiment, the first projections 56 and the second projections 69 are arranged in a zigzag pattern in predetermined directions in each of the sandwiching sections 210, respectively. Therefore, the same advantages as in the case of the first embodiment are obtained. For example, strength against deformation of the separator 204 is improved, and IR losses are reduced to achieve improvement in the power generation efficiency.

In each of the sandwiching sections 210, the first projections 56 forming the fuel gas channel 54 are provided on the surface 210*a*, and the second projections 69 forming the oxygen-containing gas channel 68 are provided on the surface 210*b*. However, the present invention is not limited in this respect. For example, the surface 210*b* may have a flat surface, and a felt member (electrically conductive nonwoven fabric such as metal felt), a mesh member (electrically conductive fabric such as metal mesh), foamed metal, expanded metal, punching metal, or pressure embossed metal (not shown) may be provided on the surface 210*b*. Also in the embodiments described later, the structure of the sandwiching section may be modified in the same manner as noted above.

Figure 14:
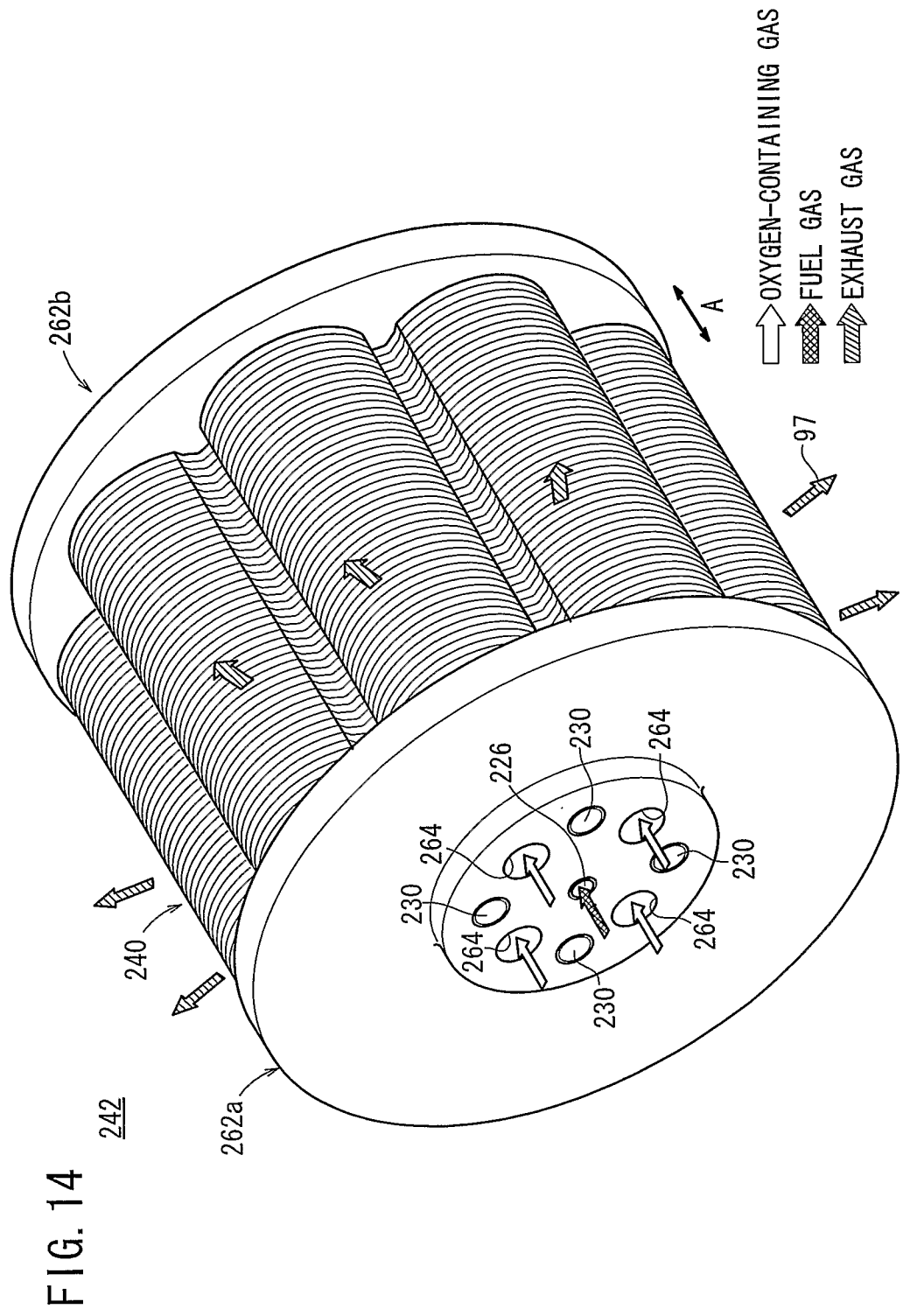
FIG. 14 is a perspective view schematically showing a fuel cell stack formed by stacking fuel cells according to a third embodiment of the present invention.

FIG. 14 is a perspective view schematically showing a fuel cell stack 242 formed by stacking fuel cells 240 according to a third embodiment of the present invention. The constituent elements that are identical to those of the fuel cell 200 according to the secondl embodiment are labeled with the same reference numeral, and description thereof will be omitted.

Figure 15:
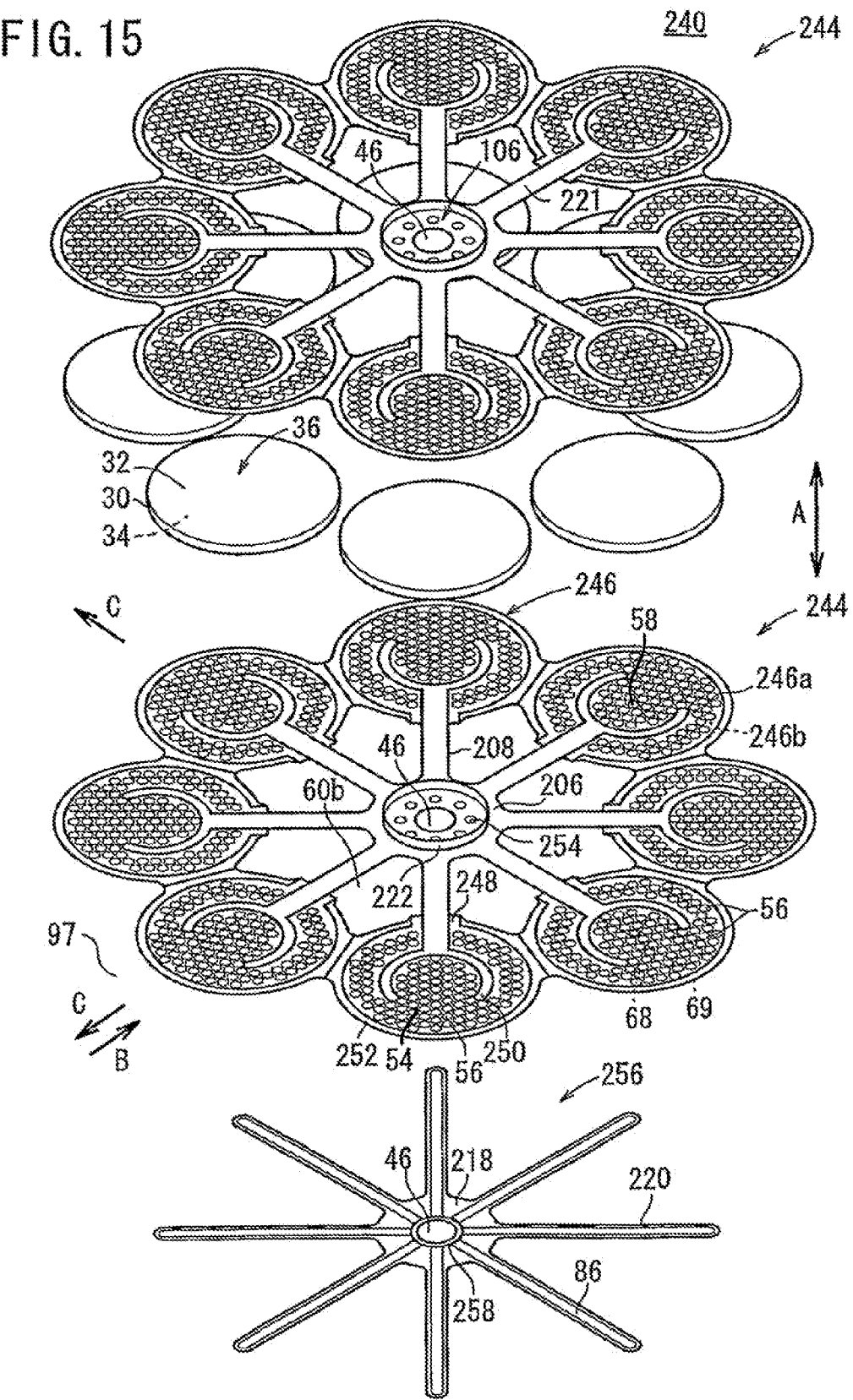
FIG. 15 is an exploded perspective view showing the fuel cell.
Figure 16:
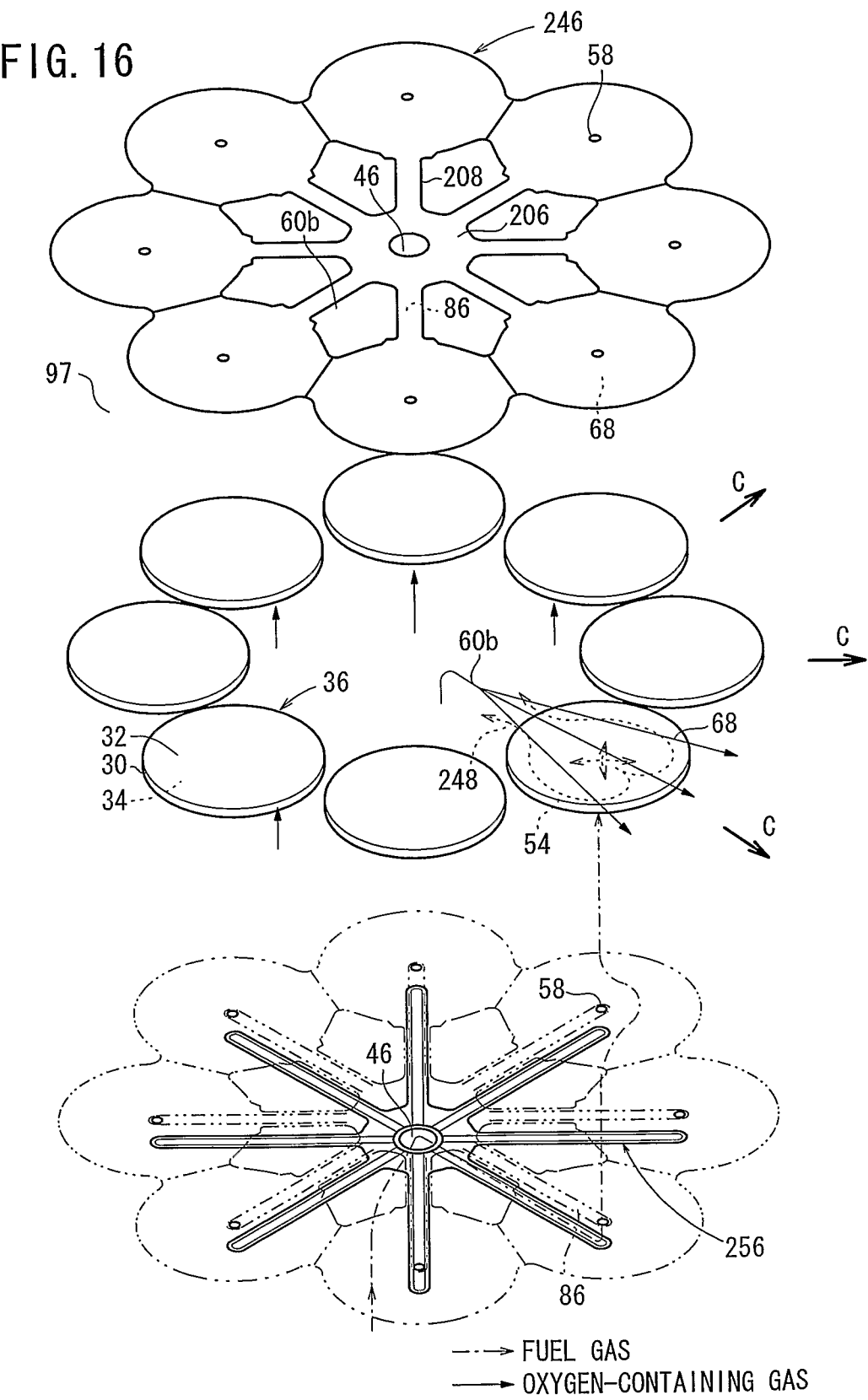
FIG. 16 is a partial exploded perspective view showing gas flows in the fuel cell.

As shown in FIGS. 15 and 16, a plurality of, e.g., eight electrolyte electrode assemblies 36 are sandwiched between a pair of separators 244 to form the fuel cell 240. A first fuel gas supply section 206 is provided at the center of the separator 244, and the fuel gas supply passage 46 extends through the first fuel gas supply section 206. The first fuel gas supply section 206 is integral with sandwiching sections 246 each having a circular disk shape through bridge portions 208, and the bridge portions 208 extend radially outwardly from the first fuel gas supply section 206 at equal angles (intervals).

Each of the sandwiching sections 246 has first projections 56 on its surface 246*a* facing the anode 34. Each of the sandwiching sections 246 has second projections 69 on its surface 246*b* facing the cathode 32. The fuel gas channel 54 is formed by the first projections 56, and the oxygen-containing gas channel 68 is formed by the second projections 69.

A fuel gas outlet 248 for discharging the fuel gas consumed in the fuel gas channel 54 and a circular arc wall 250 containing the anode 34 and forming a detour path to prevent the fuel gas from flowing straight from the fuel gas inlet 58 to the fuel gas outlet 248 are provided on the surface 246*a* of the sandwiching section 246.

The circular arc wall 250 has a substantially horseshoe shape bifurcated from the end of the bridge portion 208. The fuel gas inlet 58 is provided inside the circular arc wall 250, and the fuel gas outlet 248 is provided on a proximal end side of the circular arc wall 250, near the bridge portion 208. On the surface 246*a*, an annular protrusion 252 and a plurality of first projections 56 are provided. The annular protrusion 252 protrudes toward the fuel gas channel 54, and contacts the outer edge of the anode 34, and the first projections 56 contact the anode 34.

As shown in FIG. 15, a plurality of fuel gas orifices 254 are formed in the a first fuel gas supply section 206 around the fuel gas supply passage 46. The diameter of openings of the fuel gas orifices 254 is smaller than the diameter of the opening of the fuel gas inlet 58.

A channel lid member 256 is fixed to a surface of the separator 244 facing the cathode 32, e.g., by brazing, laser welding, or diffusion bonding. The channel lid member 256 is a flat plate, and includes a ring shaped protrusion 258 around the fuel gas supply passage 46. The protrusion 258 seals the fuel gas supply passage 46 from the fuel gas supply channel 86.

Figure 17:
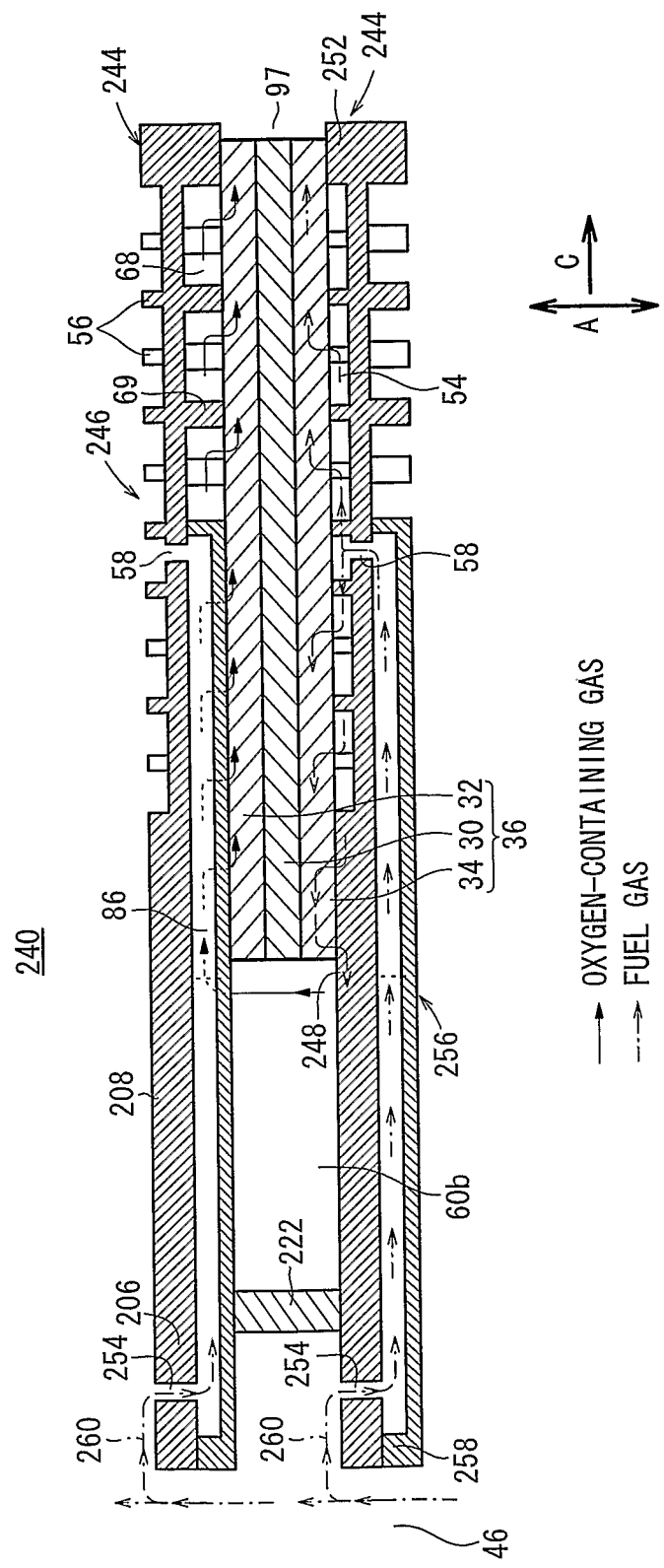
FIG. 17 is a cross sectional view schematically showing operation of the fuel cell.

In the fuel cell 240, the exhaust gas channel 97 is provided around the sandwiching sections 246. As shown in FIG. 17, when the fuel cells 240 are stacked together, a branch channel 260 branching from the fuel gas supply passage 46 along the separator surface in the direction indicated by the arrow C is formed between the separators 244. The branch channel 260 and the fuel gas supply channel 86 are connected through the fuel gas orifices 254 extending in the direction indicated by the arrow A.

As shown in FIG. 14, the fuel cell stack 242 includes end plates 262*a*, 262*b* provided at opposite ends of the fuel cells 240 in the stacking direction. Each of the end plates 262*a*, 262*b* has a substantially circular disk shape. A hole 226 corresponding to the fuel gas supply passage 46 is provided at the center of the end plate 262*a*. A plurality of holes 264 corresponding to oxygen-containing gas supply passages 60*b* are provided around the hole 226.

Operation of the fuel cell stack 242 will be described below.

As shown in FIG. 14, a fuel gas is supplied from the hole 226 of the end plate 262*a* to the fuel gas supply passage 46, and the oxygen-containing gas is supplied from the holes 264 of the end plate 262*a* to the oxygen-containing gas supply passage 60*b*. As shown in FIG. 17, the fuel gas flows along the fuel gas supply passage 46 of the fuel cell stack 242 in the stacking direction indicated by the arrow A, and the fuel gas is supplied into the branch channel 260 provided in each of the fuel cells 240.

Thus, the fuel gas flowing in the stacking direction is branched toward the direction along the separator surfaces indicated by the arrow C. Then, the fuel gas through the fuel gas orifices 254 temporarily flows in the stacking direction. Then, the fuel gas flows along the separator surfaces through the fuel gas supply channel 86 connected to the fuel gas orifices 254.

The fuel gas flows from the fuel gas supply channel 86 to the fuel gas channel 54 through the fuel gas inlet 58 formed in the sandwiching section 246. Thus, the fuel gas flows along the fuel gas channel 54 toward the outer circumferential region of the anode 34.

As shown in FIG. 15, a circular arc wall 250 is provided on the surface 246a of the sandwiching section 246 of the separator 244. The circular arc wall 250 contacts the anode 34 of the electrolyte electrode assembly 36. In the structure, the fuel gas supplied from the fuel gas inlet 58 to the fuel gas channel 54 is blocked by the circular arc wall 250. Thus, the fuel gas does not flow straight from the fuel gas inlet 58 to the fuel gas outlet 248. The fuel gas flows around in the fuel gas channel 54, and the fuel gas can be consumed effectively in the power generation reaction.

The air supplied to the oxygen-containing gas supply passage 60b flows into the space between the inner circumferential edge of the electrolyte electrode assembly 36 and the inner circumferential edge of the sandwiching section 246 in the direction indicated by the arrow C. The oxygen-containing gas is supplied to the oxygen-containing gas channel 68. In the oxygen-containing gas channel 68, the oxygen-containing gas flows from the inner circumferential edge of the cathode 32 (center of the separator 244) to the outer circumferential edge of the cathode 32 (outer circumferential edge of the separator 244).

Thus, in the electrolyte electrode assembly 36, the fuel gas flows from the center to the outer circumferential side on the electrode surface of the anode 34, and the oxygen-containing gas flows in one direction indicated by the arrow C on the electrode surface of the cathode 32. At this time, oxygen ions flow through the electrolyte 30 toward the anode 34 for generating electricity by electrochemical reactions.

In the third embodiment, the first projections 56 and the second projections 69 are arranged on the surfaces 246a, 246b of the sandwiching sections 246 in a zigzag pattern in predetermined directions, respectively. Therefore, the same advantages as in the case of the first and second embodiments are obtained. For example, strength against deformation of the separator 244 is improved, and IR losses are reduced to achieve improvement in the power generation efficiency.

Figure 18:
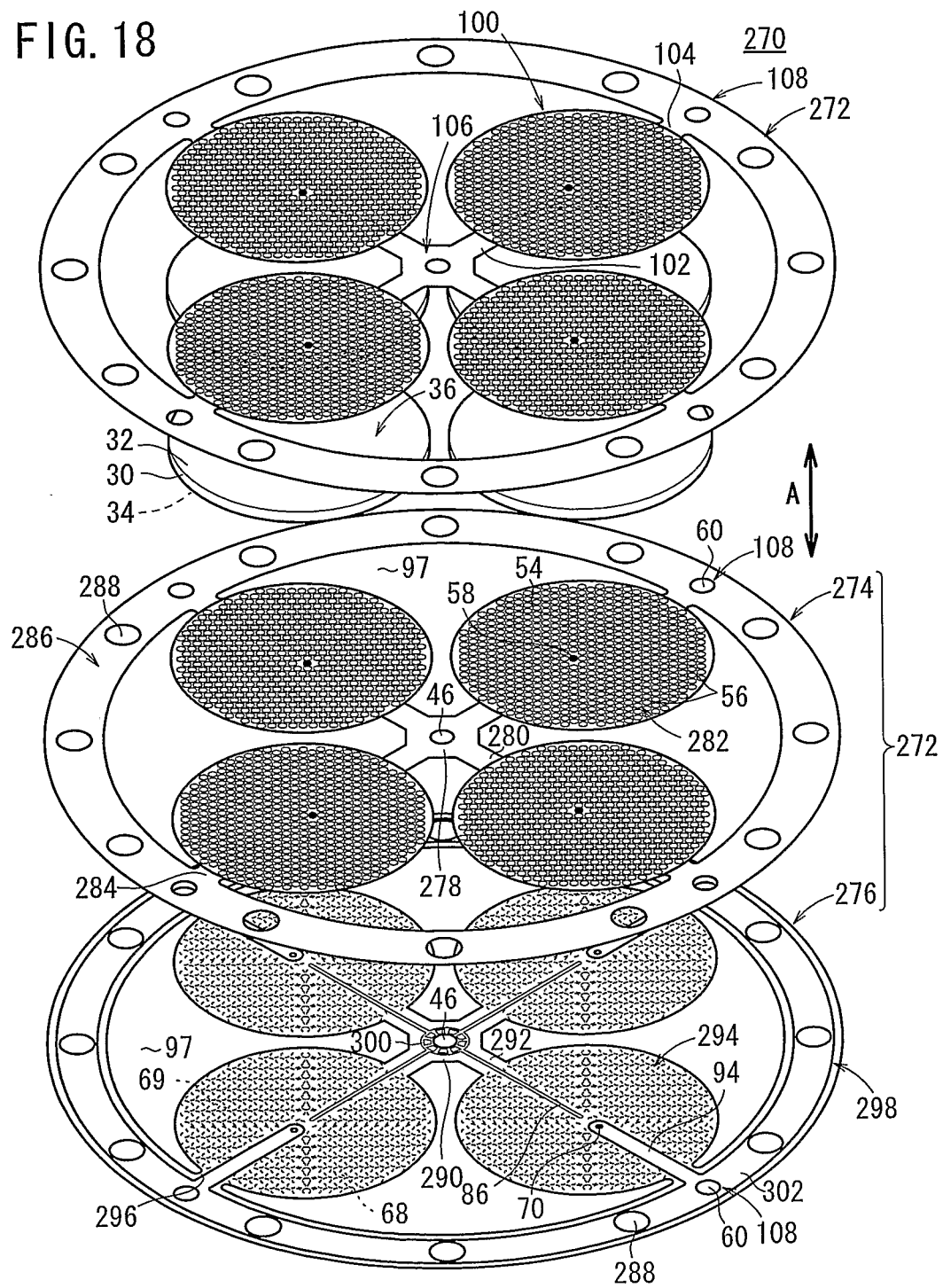
FIG. 18 is an exploded perspective view showing a fuel cell according to a fourth embodiment of the present invention.

FIG. 18 is an exploded perspective view showing a fuel cell 270 according to a fourth embodiment of the present invention.

The fuel cell 270 includes a plurality of, e.g., four electrolyte electrode assemblies 36 and a pair of separators 272 sandwiching the electrolyte electrode assemblies 36. Each of the separators 272 includes a first plate 274 and a second plate 276. For example, the first and second plates 274, 276 are metal plates of, e.g., stainless alloy.

A first fuel gas supply section 278 is formed at the center of the first plate 274, and the fuel gas supply passage 46 extends through the first fuel gas supply section 278. Four first portions 280 of the first bridge 102 extend radially outwardly from the first fuel gas supply section 278 at equal intervals. The first fuel gas supply section 278 is integral with first sandwiching sections 282 each having a relatively large diameter through the first portions 280 of the first bridge 102. The first sandwiching section 282 and the electrolyte electrode assembly 36 have substantially the same size. The first sandwiching sections 282 are integral with an annular first case unit 286 through short first portions 284 of the second bridge 104.

Each of the first sandwiching sections 282 has a plurality of first projections 56 on a surface which contacts the anode 34. The first projections 56 form a fuel gas channel 54. A fuel gas inlet 58 for supplying the fuel gas is formed at substantially the center of the first sandwiching section 282, at a position deviated toward the fuel gas supply passage 46 for supplying the fuel gas toward the substantially central region of the anode 34.

The first case unit 286 includes an oxygen-containing gas supply sections 108. The oxygen-containing gas supply passages 60 extend through the oxygen-containing gas supply sections 108 in the stacking direction, for supplying an oxygen-containing gas to oxygen-containing gas supply channels 94. A plurality of bolt insertion holes 288 are formed in the first case unit 286 at predetermined intervals (angles). The fuel gas supply passage 46, the first portion 280 of the first bridge 102, the first sandwiching section 282, the first portion 284 of the second bridge 104, and the oxygen-containing gas supply passage 60 are arranged in a straight line along the separator surface (see FIGS. 18 and 19).

A second fuel gas supply section 290 is formed at the center of the second plate 276, and the fuel gas supply passage 46 extends through the second fuel gas supply section 290. Four second portions 292 of the first bridge 102 extend radially outwardly from the second fuel gas supply section 290 at predetermined intervals (angles), and the second fuel gas supply section 290 is integral with the second sandwiching sections 294 each having a relatively large diameter through the four second portions 292 of the first bridge 102. As in the case of the first sandwiching section 282, the second sandwiching section 294 and the electrolyte electrode assembly 36 have substantially the same size. The second sandwiching sections 294 are integral with an annular second case unit 298 through short second portions 296 of the second bridge 104.

A plurality of grooves 300 connected to the fuel gas supply passage 46 are formed radially around the fuel gas supply passage 46, on a surface of the second fuel gas supply section 290 which is joined to the first fuel gas supply section 278. The grooves 300 are connected to the four fuel gas supply channels 86, and each of the fuel gas supply channels 86 extends from the second portion 292 of the first bridge 102 to a position near substantially the center of the second sandwiching section 294, and terminates at a position corresponding to the fuel gas inlet 58 of the first plate 274. A plurality of second projections 69 are provided to form the oxygen-containing gas channel 68 on a surface of the second sandwiching section 294 which contacts the cathode 32.

The second case unit 298 includes oxygen-containing gas supply sections 108 and bolt insertion holes 288. The oxygen-containing gas supply passages 60 extend through the oxygen-containing gas supply sections 108 in the stacking direction. The second case unit 298 has a filling chamber 302 on a surface joined to the first case unit 286, and the filling chamber 302 is filled with the oxygen-containing gas supplied from the oxygen-containing gas supply passages 60.

The filling chamber 302 is connected to the oxygen-containing gas supply channels 94. Each of the oxygen-containing gas supply channels 94 extends from the second portion 296 of the second bridge 104 to a position near substantially the center of the second sandwiching section 294, and the front end of the oxygen-containing gas supply channel 94 is connected to an oxygen-containing gas inlet 70 passing through the second sandwiching section 294.

Figure 20:
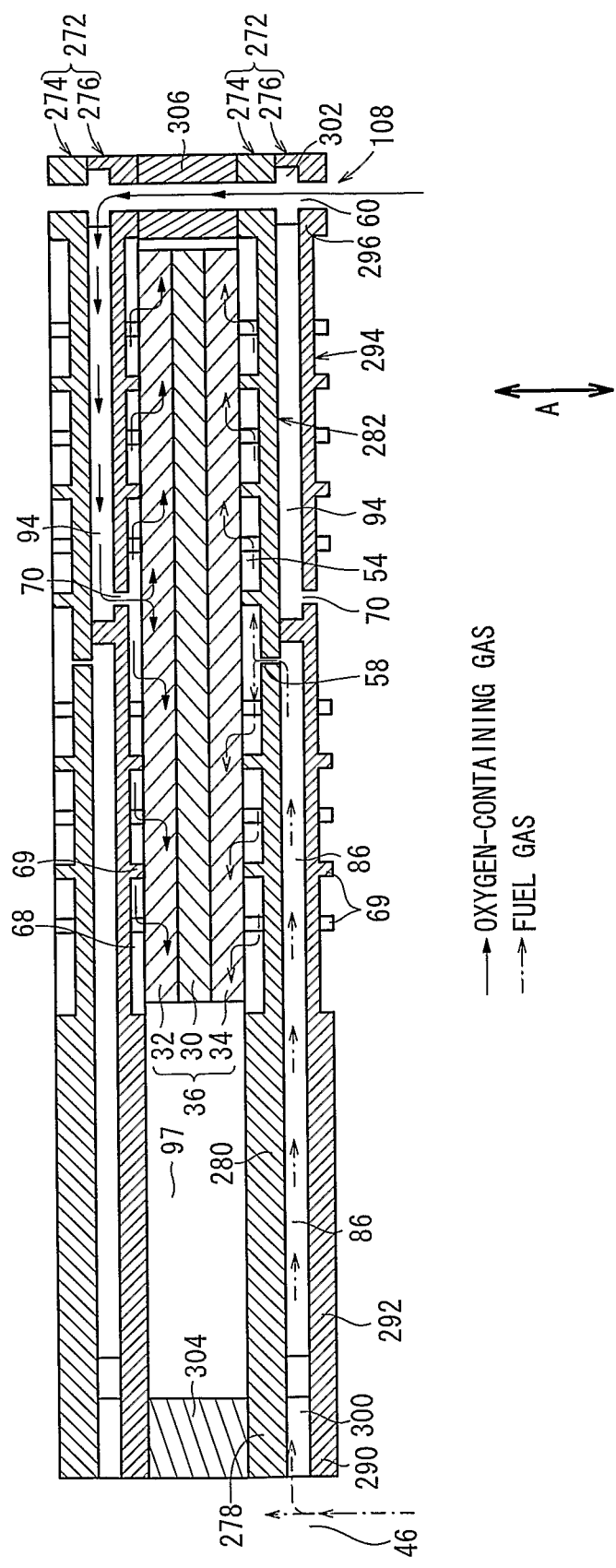
FIG. 20 is a cross sectional view schematically showing operation of the fuel cell.

As shown in FIG. 20, a first insulating seal 304 for sealing the fuel gas supply passage 46 and second insulating seals 306 for sealing the oxygen-containing gas supply passages 60 are formed between the separators 272. The first insulating seal 304 and the second insulating seals 306 are made of materials such as crustal component material (for example, mica material, ceramic material), glass material, and composite material of clay and plastic, for example, since these materials have good sealing performance, and are hard and not collapsed easily. Further, preferably, the second insulating seal 306 is a heat insulating member for preventing diffusion of heat energy.

Operation of the fuel cell 270 will be described below.

Figure 19:
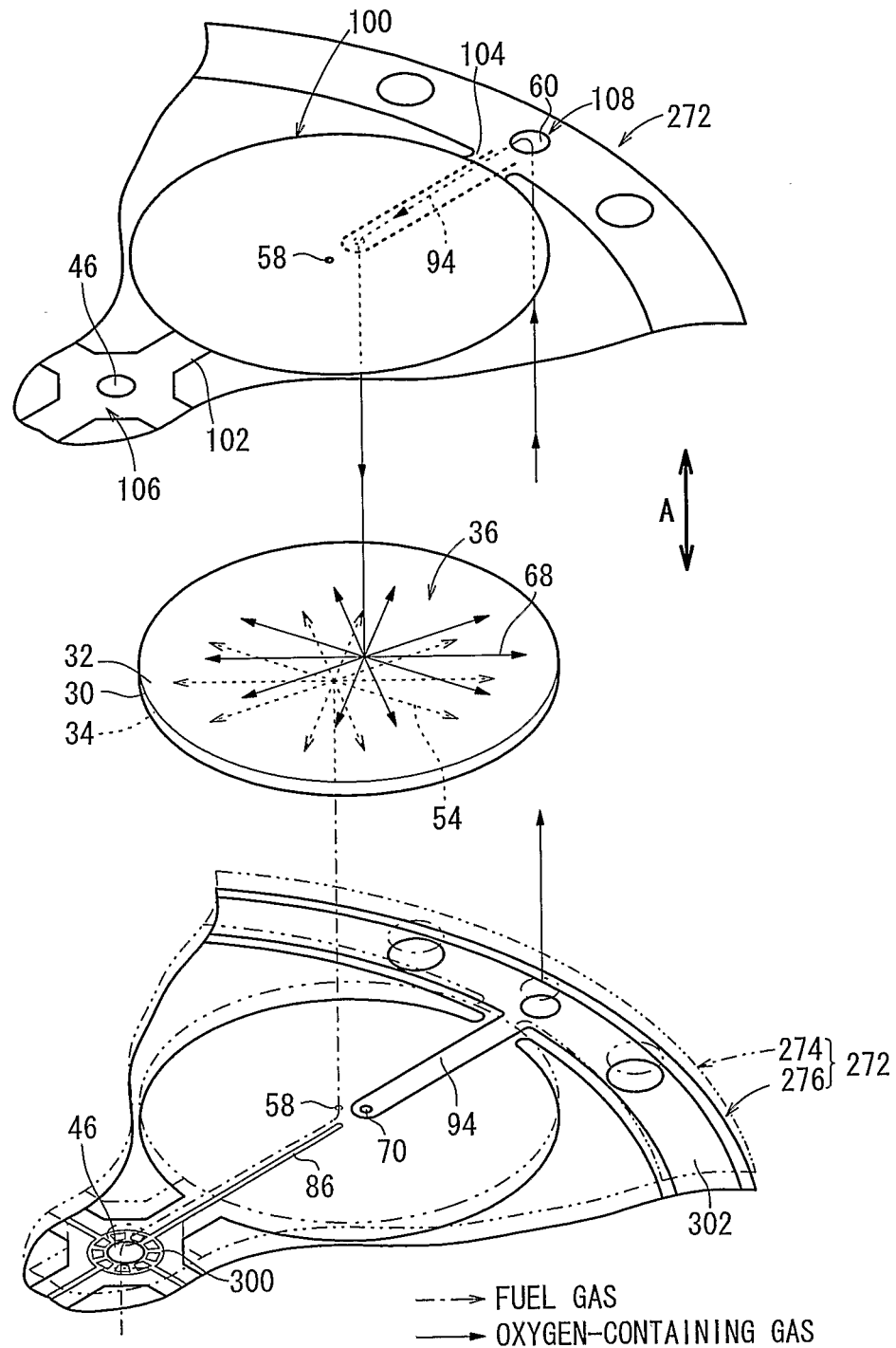
FIG. 19 is a partial exploded perspective view showing gas flows in the fuel cell.

As shown in FIGS. 19 and 20, the fuel gas supplied to the fuel gas supply passage 46 flows in the stacking direction indicated by the arrow A, and the fuel gas is supplied from the grooves 300 formed in the second plate 276 of the separator 272 to the fuel gas supply channels 86. After the fuel gas flows along each fuel gas supply channel 86, the fuel gas flows through the fuel gas inlet 58 formed in the first plate 274 to the fuel gas channel 54.

The air supplied to the oxygen-containing gas supply section 108 temporarily fills the filling chamber 302 provided between the first case unit 286 of the first plate 274 and the second case unit 298 of the second plate 276. The filling chamber 302 is connected to the oxygen-containing gas supply channels 94. The oxygen-containing gas moves toward the center of the first sandwiching section 282 and the second sandwiching section 294 along each of the oxygen-containing gas supply channels 94.

The oxygen-containing gas inlet 70 is opened to a position near the center of the second sandwiching section 294. The oxygen-containing gas inlet 70 is positioned at substantially the center of the cathode 32 of the electrolyte electrode assembly 36. Therefore, the air is supplied from the oxygen-containing gas inlet 70 to the cathode 32. The oxygen-containing gas flows from the substantially central region to the outer circumferential region of the cathode 32 along the oxygen-containing gas channel 68.

Thus, in each of the electrolyte electrode assemblies 36, the fuel gas flows from substantially the central region to the outer circumferential region of the anode 34, and the air flows from the substantially central region to the outer circumferential region of the cathode 32 for generating electricity. The fuel gas and the air partially consumed in the power generation are discharged from the outer circumferential region of each of the electrolyte electrode assemblies 36, and flows through the exhaust gas channels 97.

In the fourth embodiment, in the first and second sandwiching sections 282, 294, the first projections 56 and the second projections 69 are arranged in a zigzag pattern in predetermined directions, respectively. Therefore, the same advantages as in the case of the first to third embodiments are obtained. For example, strength against deformation of the separator 272 is improved, and IR losses are reduced to achieve improvement in the power generation efficiency.

Figure 21:
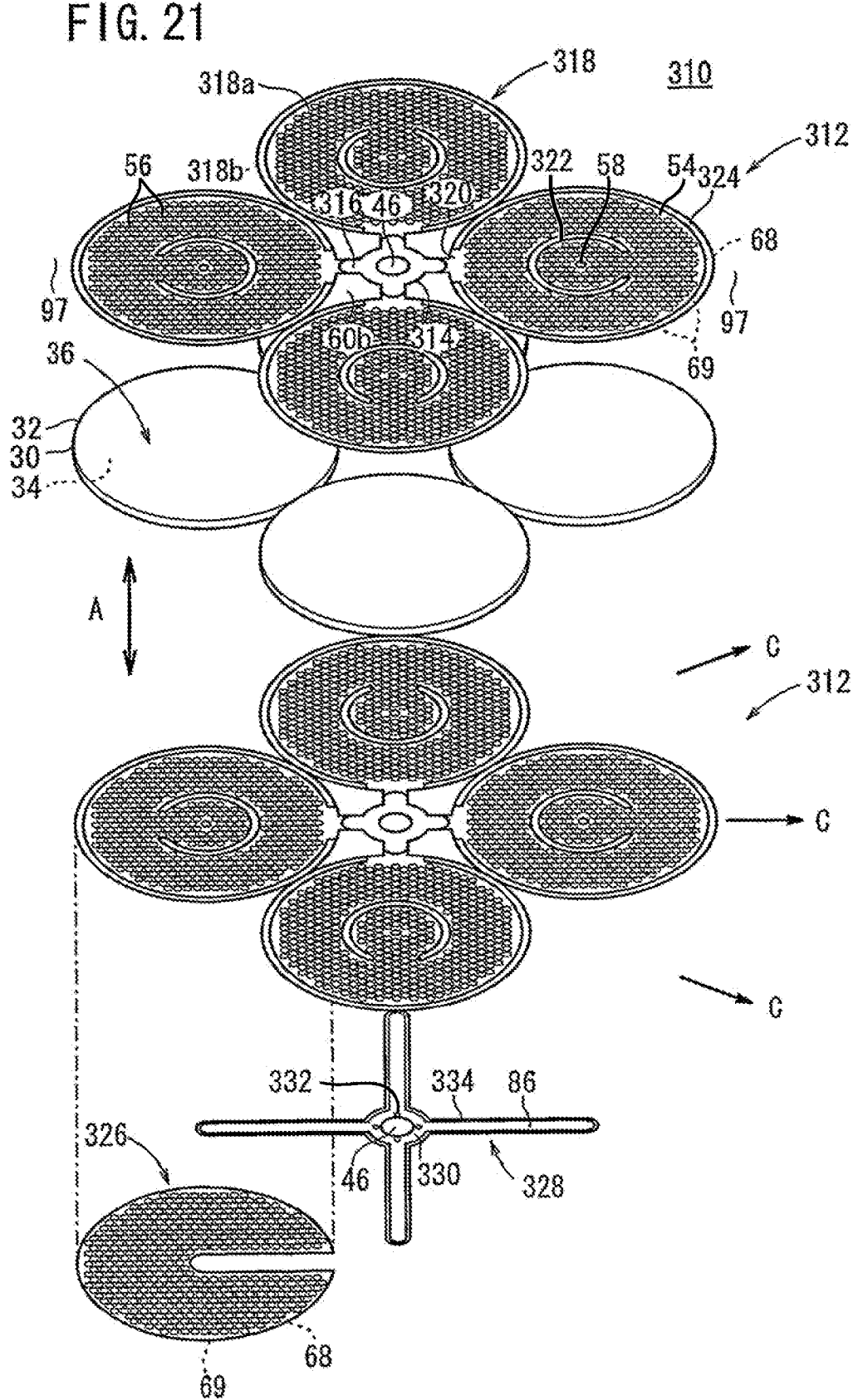
FIG. 21 is an exploded perspective view showing a fuel cell according to a fifth embodiment of the present invention.
Figure 22:
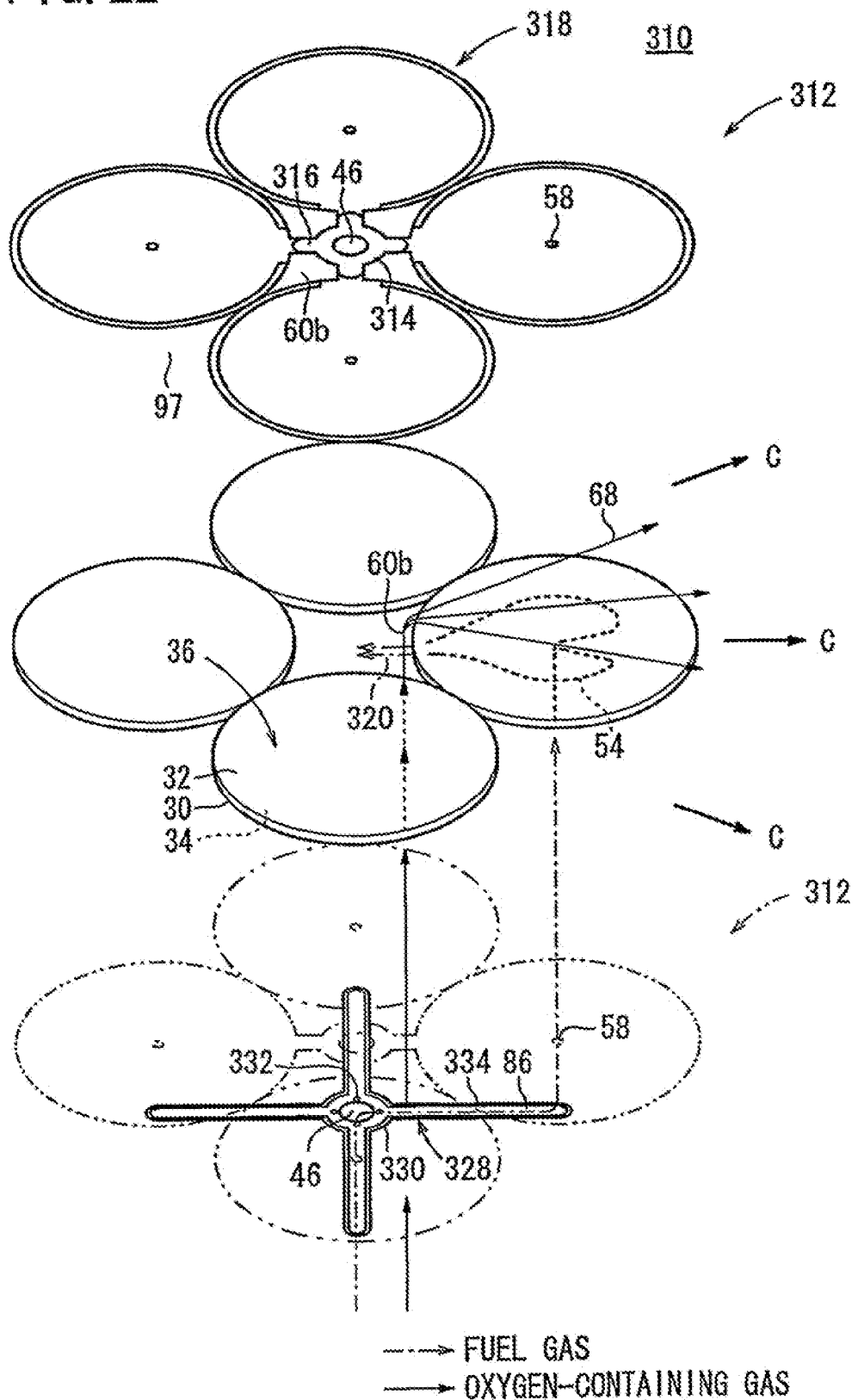
FIG. 22 is a partial exploded perspective view showing gas flows in the fuel cell.
Figure 23:
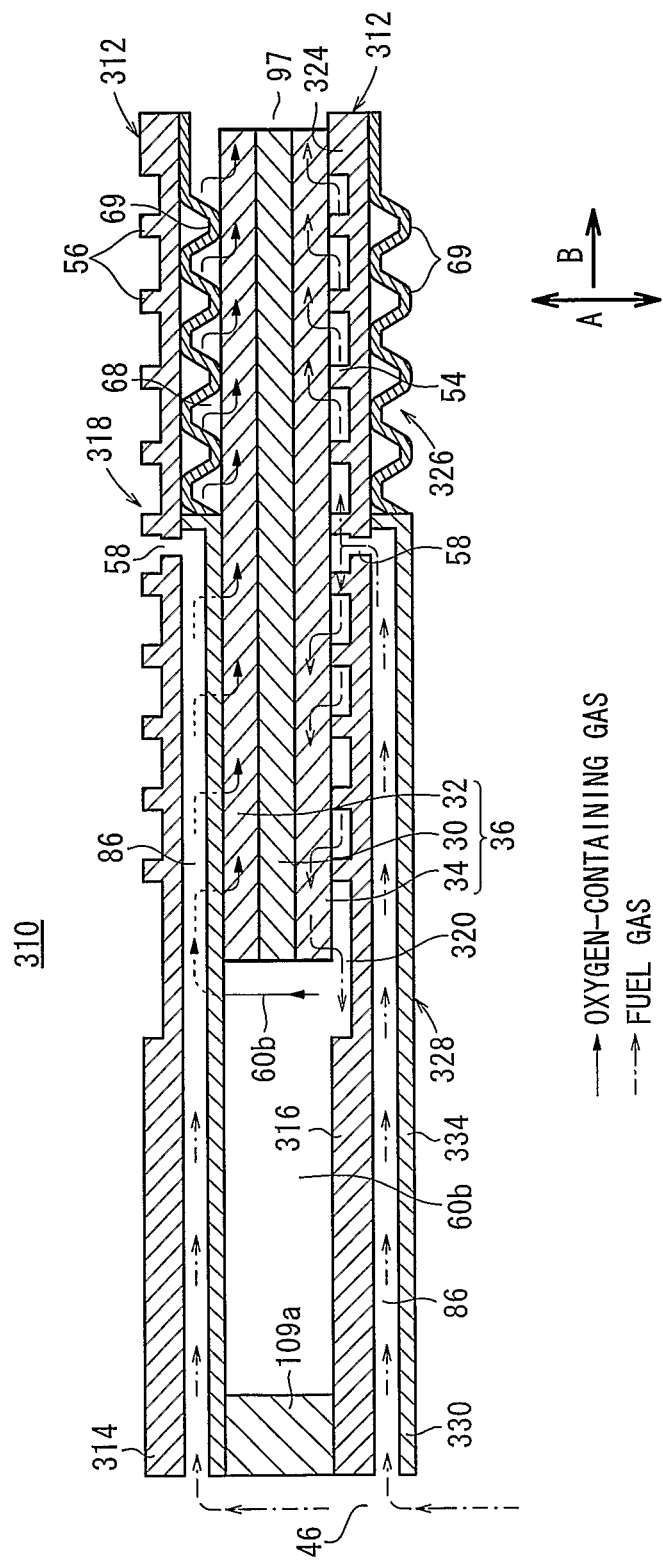
FIG. 23 is a cross sectional view schematically showing operation of the fuel cell.

FIG. 21 is an exploded perspective view showing a fuel cell 310 according to a fifth embodiment of the present invention.

The fuel cell 310 is formed by sandwiching a plurality of, e.g., four electrolyte electrode assemblies 36 between a pair of separators 312. A first fuel gas supply section 314 is formed at the center of the separator 312, and the fuel gas supply passage 46 extends through the first fuel gas supply section 314. Four bridge portions 316 extend radially outwardly from the first fuel gas supply section 314 at equal intervals. The bridge portions 316 are integral with sandwiching sections 318 each having a circular disk shape.

The centers of the sandwiching sections 318 are equally distanced from the center of the first fuel gas supply section 314. The sandwiching sections 318 are separated from each other. A plurality of first projections 56 forming the fuel gas channel 54 are provided on a surface 318a of the sandwiching section 318 which contacts the anode 34.

A fuel gas outlet 320 for discharging the fuel gas used in the fuel gas channel 54 and a circular arc wall 322 forming a detour path to prevent the fuel gas from flowing straight from the fuel gas inlet 58 to the fuel gas outlet 320 are provided on the surface 318a of the sandwiching section 318. Further, an annular protrusion 324 is provided on the surface 318a. The annular protrusion 324 protrudes toward the fuel gas channel 54, and contacts the outer edge of the anode 34.

Each of the sandwiching section 318 has a substantially flat surface 318b which contacts the cathode 32. A plate 326 having a circular disk shape is fixed to the surface 318b. A plurality of second projections 69 are provided on the plate 326. The second projections 69 contact the cathode 32 to form the oxygen-containing gas channel 68.

A channel lid member 328 is fixed to a surface of the separator 312 facing the cathode 32. A second fuel gas supply section 330 is formed at the center of the channel lid member 328, and the fuel gas supply passage 46 extends through the second fuel gas supply section 330. A plurality of reinforcement bosses 332 are formed in the fuel gas supply section 330. Four bridge portions 334 extend radially from the second fuel gas supply section 330. Each of the bridge portions 334 is fixed to the separator 312, from the bridge portion 316 to the surface 318b of the sandwiching section 318, covering the fuel gas inlet 58 to form the fuel gas supply channel 86. The channel lid member 328 may be formed integrally with the plate 326.

The oxygen-containing gas channel 68 is connected to the oxygen-containing gas supply passage 60b, and the oxygen-containing gas is supplied in the direction indicated by the arrow C through the space between the inner circumferential edge of the electrolyte electrode assembly 36 and the inner circumferential edge of the sandwiching section 318. The oxygen-containing gas supply passage 60b extends inside the respective sandwiching sections 318 between the bridge portions 316 in the stacking direction.

In the fuel cell 310, the fuel gas from the fuel gas fuel gas supply passage 46 flows through the fuel gas supply channels 86, and the fuel gas flows into the fuel gas channel 54 from the fuel gas inlet 58 formed in each of the sandwiching sections 318. In the structure, the fuel gas is supplied to substantially the center of the anode 34, and then, the fuel gas flows toward the outer circumferential region of the anode 34 along the fuel gas channel 54.

The air supplied to the oxygen-containing gas supply passage 60b flows into the space between the inner circumferential edge of the electrolyte electrode assembly 36 and the inner circumferential edge of the circular disk sandwiching section 318 indicated by the arrow C, and the air is supplied to the oxygen-containing gas channel 68. In the oxygen-containing gas channel 68, the air flows from the inner circumferential edge to the outer circumferential edge of the cathode 32 of the electrolyte electrode assembly 36.

In the fifth embodiment, the first projections 56 and the second projections 69 are arranged in a zigzag pattern in predetermined directions in each of the sandwiching sections 318, respectively. Therefore, the same advantages as in the case of the first to fourth embodiments are obtained. For example, strength against deformation of the separator 312 is improved, and IR losses are reduced to achieve improvement in the power generation efficiency.

Figure 24:
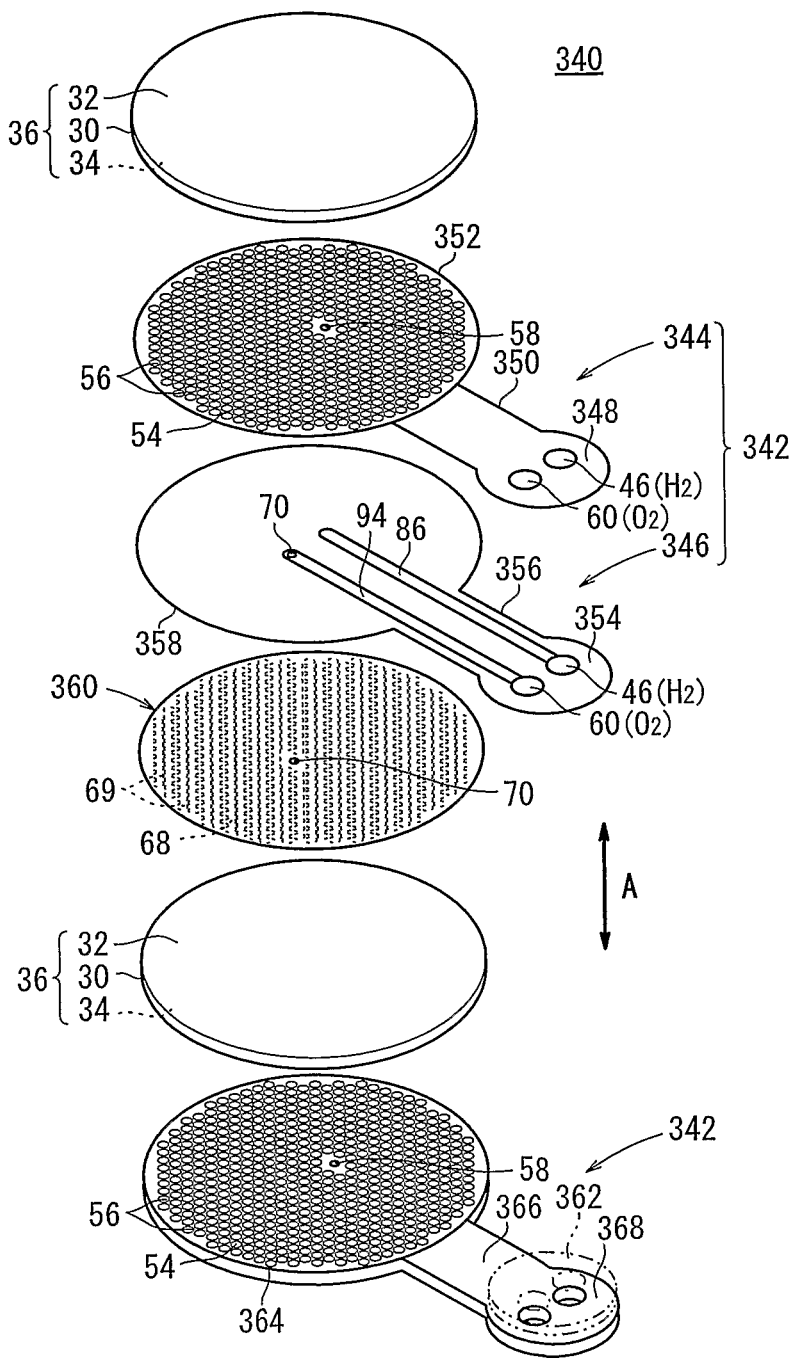
FIG. 24 is an exploded perspective view showing a fuel cell according to a sixth embodiment of the present invention.

FIG. 24 is an exploded perspective view showing a fuel cell 340 according to a sixth embodiment of the present invention.

The fuel cell 340 is formed by sandwiching a single electrolyte electrode assembly 36 between a pair of separators 342. Each of the separators 342 includes a first plate 344 and a second plate 346. For example, the first and second plates 344, 346 are metal plates of, e.g., stainless alloy, and the first plate 344 and the second plate 346 are joined to each other, e.g., by diffusion bonding, laser welding, or brazing.

The first plate 344 includes a first reactant gas supply section 348. A fuel gas supply passage 46 for supplying a fuel gas and an oxygen-containing gas supply passage 60 for supplying an oxygen-containing gas are formed in the first reactant gas supply section 348 in the stacking direction indicated by the arrow A. The first reactant gas supply section 348 is integral with a first sandwiching section 352 having a relatively large diameter through a narrow bridge portion 350.

The first sandwiching section 352 and the electrolyte electrode assembly 36 have substantially the same size. For example, a fuel gas inlet 58 for supplying the fuel gas is formed at a position deviated from the center of the first sandwiching section 352. The first sandwiching section 352 has a large number of first projections 56 on its surface which contacts the anode 34. The first projections 56 form a fuel gas channel 54 for supplying the fuel gas along an electrode surface of the anode 34.

The second plate 346 includes a second reactant gas supply section 354. The fuel gas supply passage 46 and the oxygen-containing gas supply passage 60 extend through the second reactant gas supply section 354. The second reactant gas supply section 354 is integral with a second sandwiching section 358 having a relatively large diameter through narrow bridge portion 356. An oxygen-containing gas inlet 70 for supplying the oxygen-containing gas is provided at a position deviated from the center of the second sandwiching section 358 in a direction opposite to the deviation of the fuel gas inlet 58.

A fuel gas supply channel 86 for supplying fuel gas from the fuel gas supply passage 46 to the fuel gas inlet 58 and an oxygen-containing gas supply channel 94 for supplying the oxygen-containing gas from the oxygen-containing gas supply passage 60 to the oxygen-containing gas inlet 70 are formed in the bridge portion 356. Alternatively, the fuel gas supply channel 86 and the oxygen-containing gas supply channel 94 may be provided in the bridge portion 350 of the first plate 344.

A plate 360 having a circular disk shape is fixed to a surface of the second sandwiching section 358 which contacts the cathode 32, e.g., by brazing, laser welding, or diffusion bonding. A plurality of second projections 69 are provided on the plate 360, e.g., by pressure forming or etching. The second projections 69 form an oxygen-containing gas channel 68 for supplying the oxygen-containing gas along an electrode surface of the cathode 32. An insulating seal 362 for sealing the fuel gas supply passage 46 and the oxygen-containing gas supply passage 60 are provided in each space between the separators 342.

In the separator 342, the first sandwiching section 352 of the first plate 344 and the second sandwiching section 358 (including the plate 360) of the second plate 346 are joined together to form a sandwiching section 364 having a circular disk shape. A bridge 366 formed by joining the bridge portion 350 and the bridge portion 356 is connected to the sandwiching section 364. A reactant gas supply section 368 formed by joining the first reactant gas supply section 348 and the second reactant gas supply section 354 is connected to the bridge 366.

The first projections 56 and the second projections 69 are arranged in a zigzag pattern in a direction in which the bridge 366 extends, in a direction in which the fuel gas supply channel 86 and the oxygen-containing gas supply channel 94 extend, and in a direction of a straight line connecting the center of the reactant gas supply section 368 and the center of gravity (or the center) of the sandwiching section 364.

Figure 25:
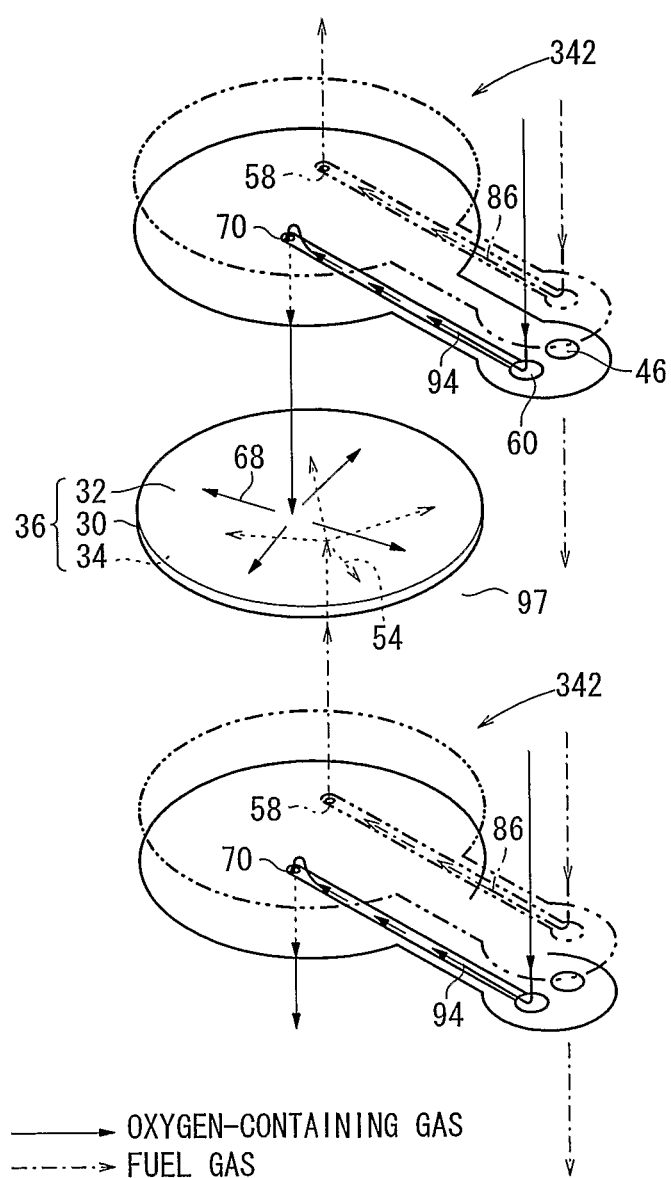
FIG. 25 is a partial exploded perspective view showing gas flows in the fuel cell.
Figure 26:
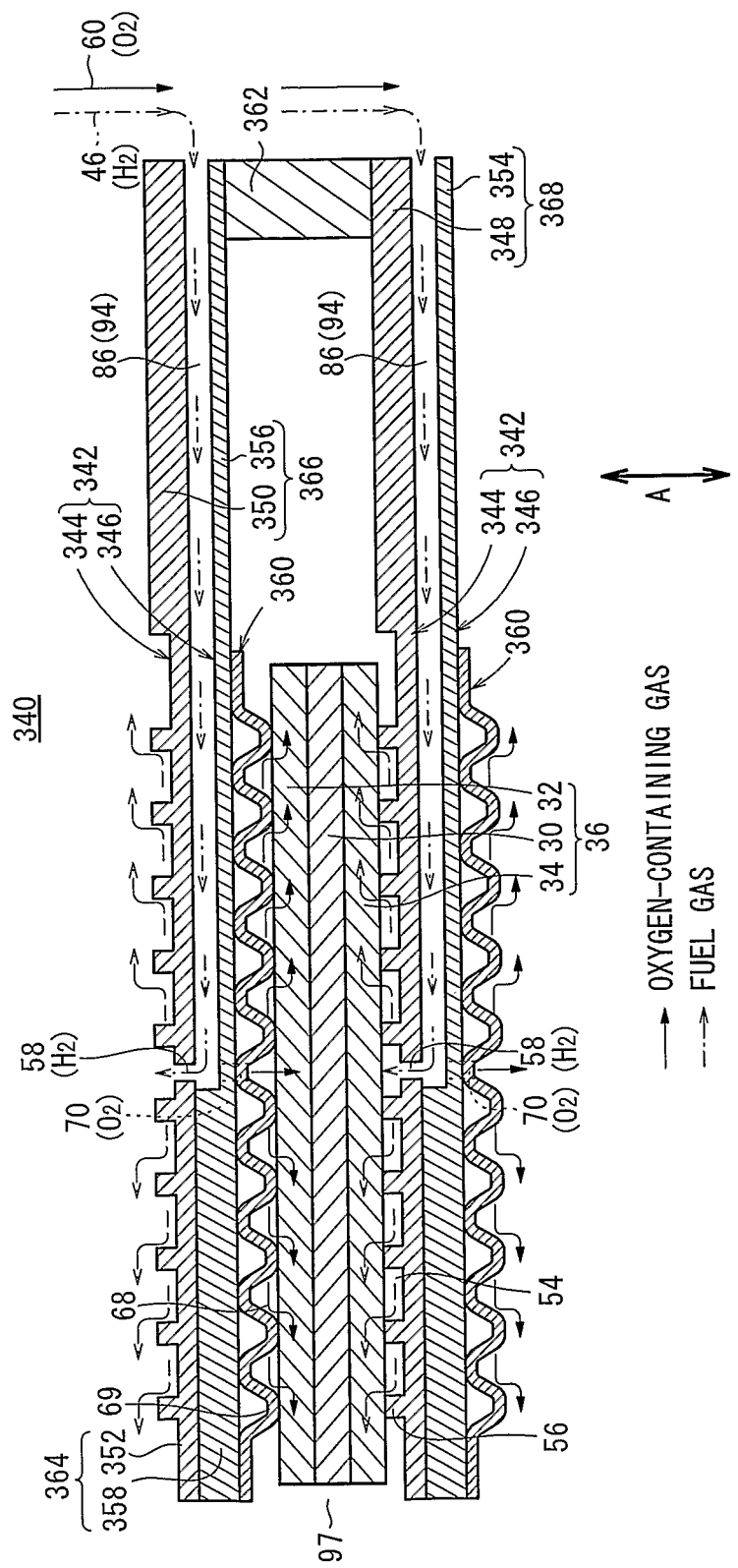
FIG. 26 is a cross sectional view schematically showing operation of the fuel cell.

In the fuel cell 340, as shown in FIGS. 25 and 26, the fuel gas flows along the fuel gas supply passage 46 in the stacking direction indicated by the arrow A, and flows along each of the fuel gas supply channels 86 in the direction in which the surface of the separator 342 extends. The fuel gas from the fuel gas supply channel 86 flows through the fuel gas inlet 58 formed in the first sandwiching section 352, and flows into the fuel gas channel 54.

The fuel gas inlet 58 is provided at a position corresponding to the central position of the anode 34 in each of the electrolyte electrode assemblies 36. Therefore, the fuel gas from the fuel gas inlet 58 is supplied to the fuel gas channel 54, and flows from the central region of the anode 34 toward the outer circumferential region of the anode 34.

The air flows along the oxygen-containing gas supply passage 60 in the stacking direction indicated by the arrow A, and flows along each of the oxygen-containing gas supply channels 94 in the direction in which the surface of the separator 342 extends.

The air from the oxygen-containing gas supply channel 94 is supplied into the oxygen-containing gas inlet 70 formed at the center of the second sandwiching section 358 and the plate 360. The oxygen-containing gas inlet 70 is provided at a position corresponding to the central position of the cathode 32 in each of the electrolyte electrode assemblies 36. Therefore, the oxygen-containing gas from the oxygen-containing gas inlet 70 is supplied to the oxygen-containing gas channel 68, and flows from the central region of the cathode 32 toward the outer circumferential region of the cathode 32.

In the sixth embodiment, the first projections 56 and the second projections 69 are arranged in a zigzag pattern in predetermined directions in each of the first and second sandwiching sections 352, 358 (plate 360), respectively. Therefore, the same advantages as in the case of the first to fifth embodiments are obtained. For example, strength against deformation of the separator 342 is improved, and IR losses are reduced to achieve improvement in the power generation efficiency.

Figure 27:
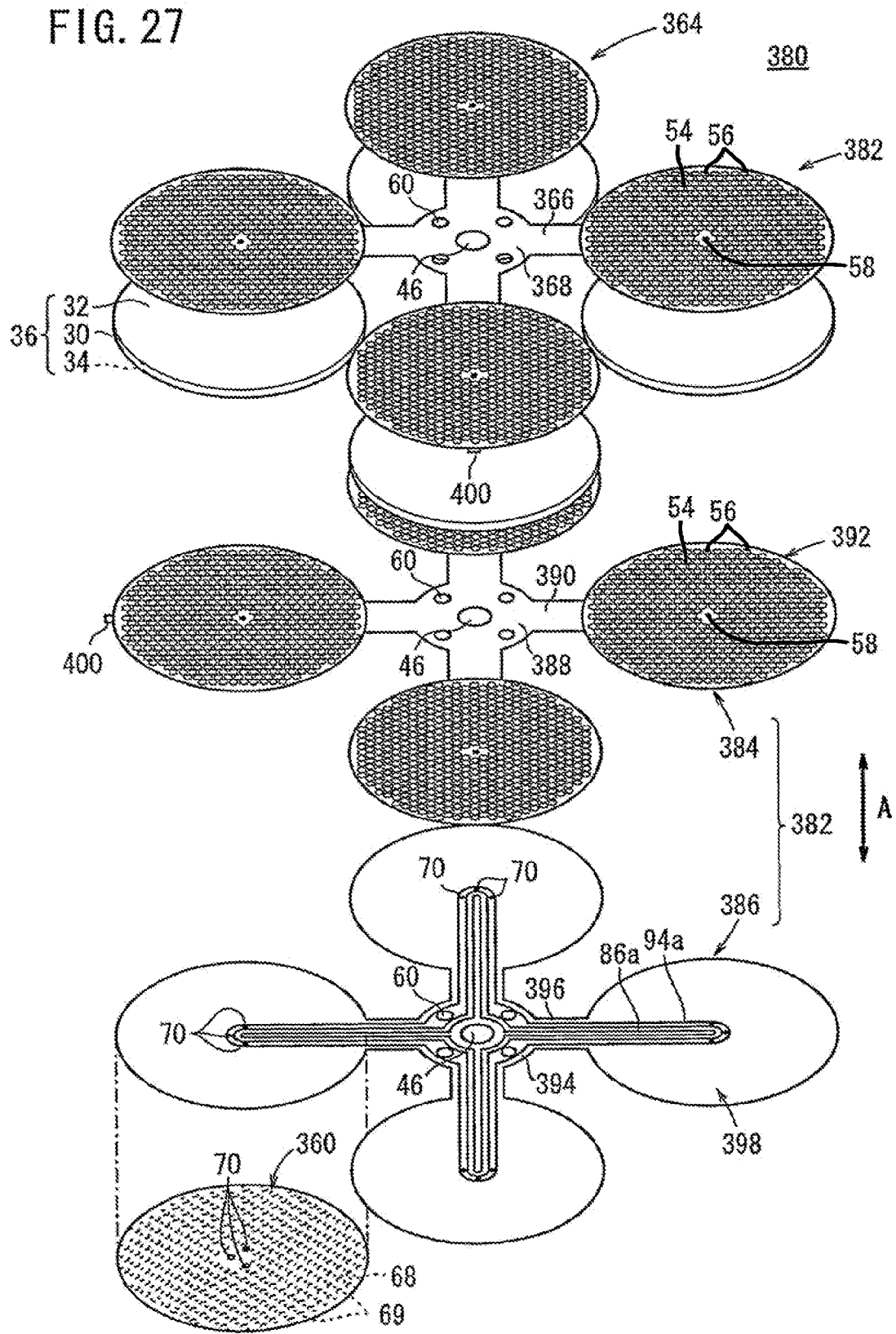
FIG. 27 is an exploded perspective view showing a fuel cell according to a seventh embodiment of the present invention.

FIG. 27 is an exploded perspective view showing a fuel cell 380 according to a seventh embodiment of the present invention.

In the fuel cell 380, four electrolyte electrode assemblies 36 are sandwiched between separators 382. The electrolyte electrode assemblies 36 are arranged in a circle around a reactant gas supply section 368 provided at the center of the separators 382.

The separator 382 includes a first plate 384 and a second plate 386 which are metal plates made of, for example, stainless alloy. The first plate 384 has a first reactant gas supply section 388. A fuel gas supply passage 46 extends through the center of the first reactant gas supply section 388, and a plurality of, e.g., four oxygen-containing gas supply passages 60 are arranged in a circle around the fuel gas supply passage 46. The total flow field cross sectional area of the four oxygen-containing gas supply passages 60 is larger than the flow field cross sectional area of the fuel gas supply passage 46.

Four bridge portions 390 extend radially outwardly from the first reactant gas supply section 388 at equal intervals, e.g., 90°. The first reactant gas supply section 388 is integral with first sandwiching sections 392 each having a relatively large diameter through the bridge portions 390. The centers of the first sandwiching sections 392 are equally distanced from the center of the first reactant gas supply section 388. Each of the oxygen-containing gas supply passages 60 is provided in each space between the bridge portions 390.

Each of the first sandwiching sections 392 has a circular disk shape, having substantially the same dimensions as the electrolyte electrode assembly 36. The first sandwiching sections 392 are separated from each other. A fuel gas inlet 58 for supplying the fuel gas is formed, e.g., at the center of the first sandwiching section 392. A large number of first projections 56 are formed in a surface of the first sandwiching section 392 which contacts the anode 34, and the fuel gas channel 54 is formed by the first projections 56.

A second reactant gas supply section 394 is formed in the second plate 386, and the fuel gas supply passage 46 extends through the center of the second reactant gas supply section 394. A plurality of, e.g., four oxygen-containing gas supply passages 60 are arranged in a circle around the fuel gas supply passage 46.

Four bridge portions 396 extend radially outwardly from the second reactant gas supply section 394 at equal intervals, e.g., 90°. The second reactant gas supply section 394 is integral with second sandwiching sections 398 each having a relatively large diameter through the bridge portions 396. A plate 360 is joined to a surface of the second sandwiching section 398 facing the cathode 32 by, e.g., brazing, laser welding, or diffusion bonding to form the oxygen-containing gas channel 68 between second projections 69.

Four fuel gas supply channels 86a for supplying the fuel gas from the fuel gas supply passage 46 to the fuel gas inlets 58 and four pairs of oxygen-containing gas supply channels 94a for supplying the oxygen-containing gas from the oxygen-containing gas supply passage 60 to the oxygen-containing gas inlets 70 are provided in the bridge portion 396.

Figure 28:
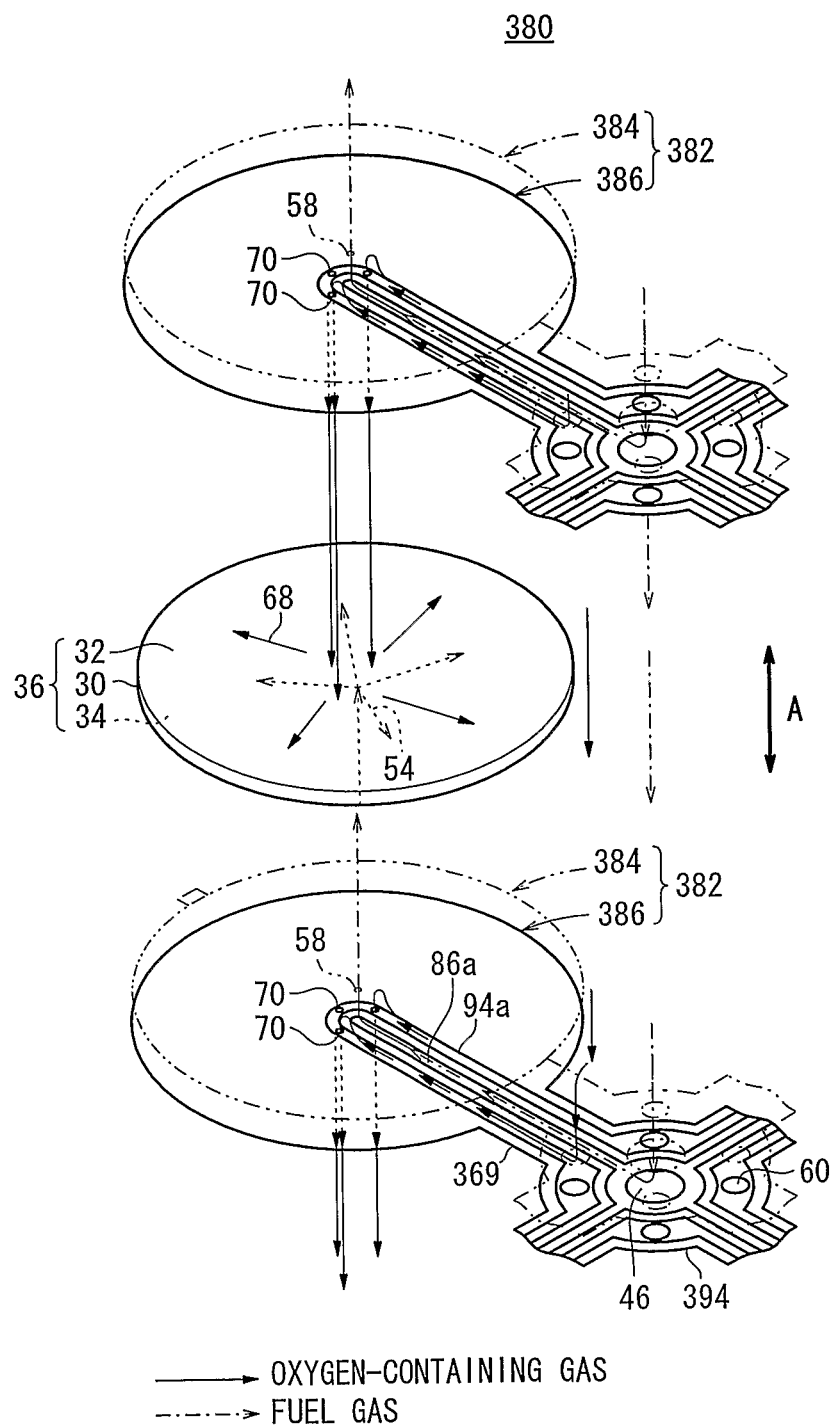
FIG. 28 is a partial exploded perspective view showing gas flows in the fuel cell.
Figure 29:
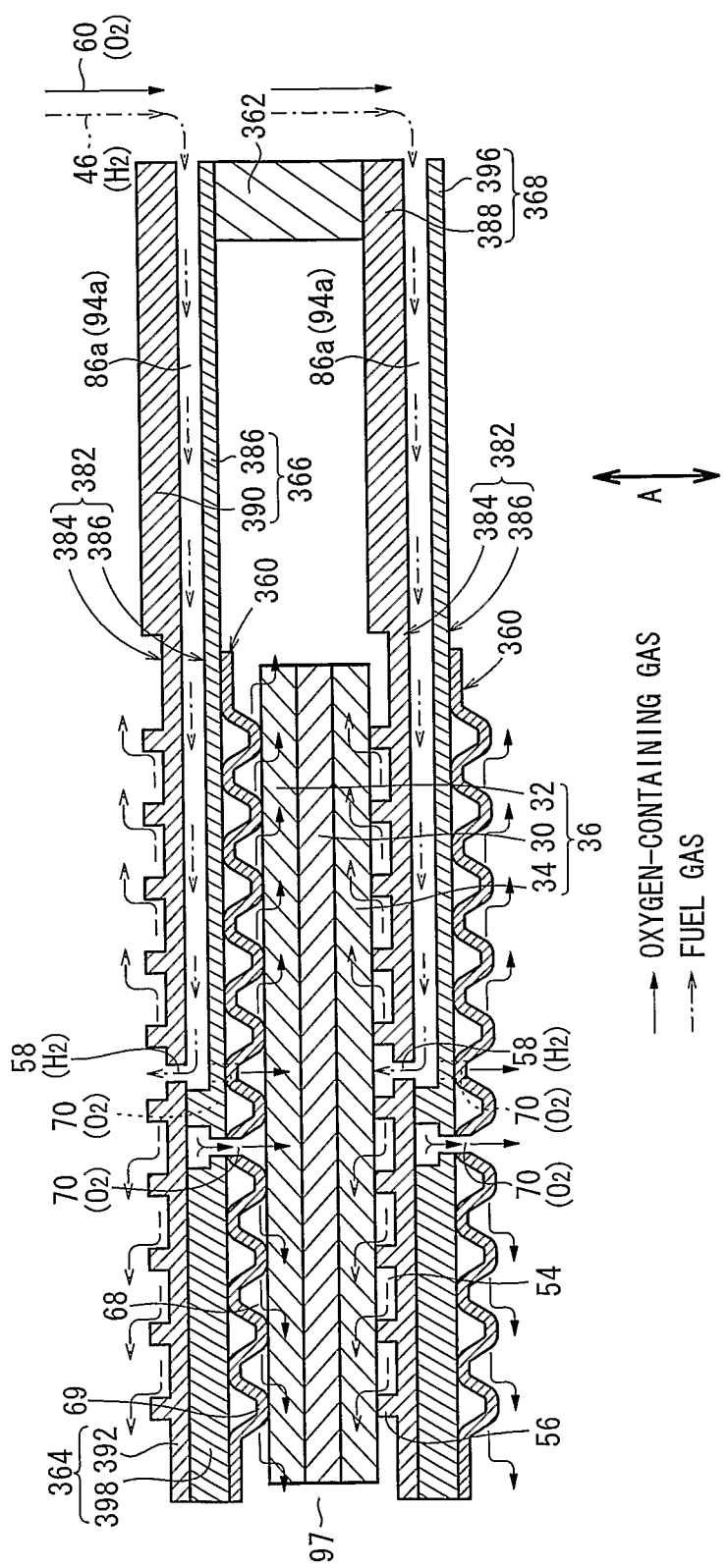
FIG. 29 is a cross sectional view schematically showing operation of the fuel cell.
Figure 30:
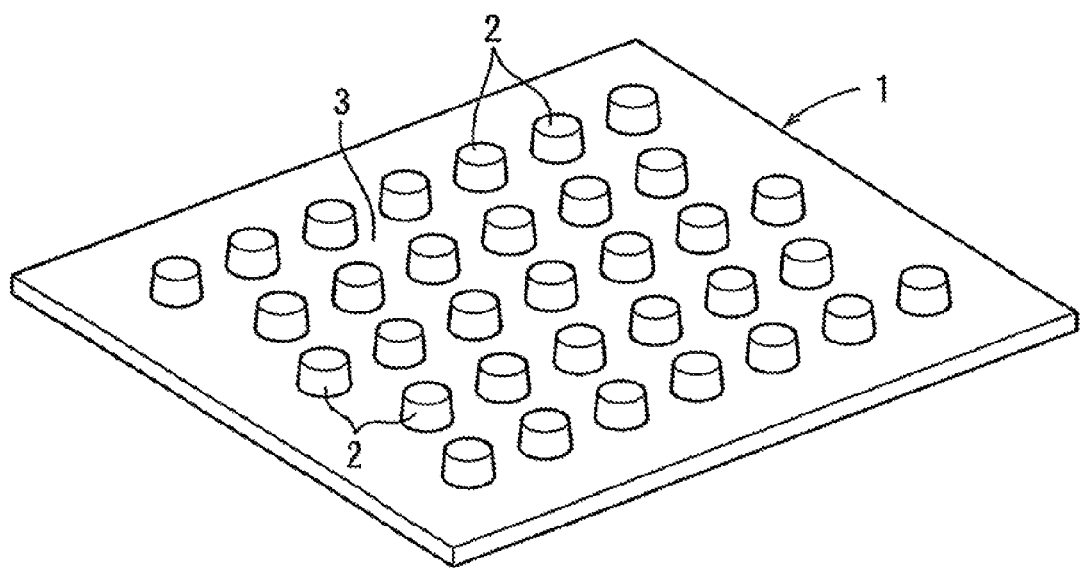
FIG. 30 is a view showing a separator disclosed in International Publication No. WO 00/03446.
Figure 31:
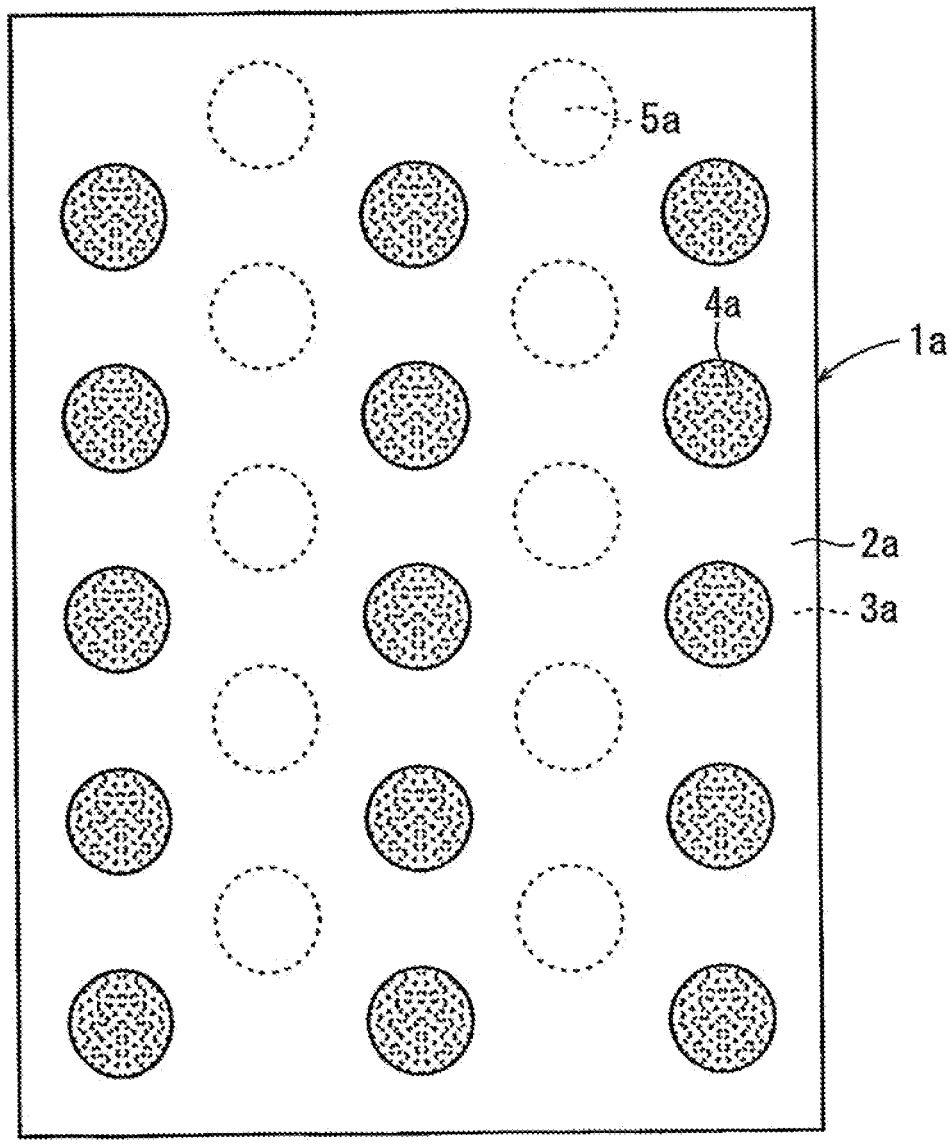
FIG. 31 is a view showing a separator disclosed in Japanese Laid-Open Patent Publication No. 2005-293877.

Two oxygen-containing gas supply channels 94a are provided in each of the bridge portions 396. In each second sandwiching section 398, the oxygen-containing gas supply channels 94a are connected together. The fuel gas supply channel 86a is provided between the two oxygen-containing gas supply channels 94a. Three oxygen-containing gas inlets 70 are provided in the second sandwiching section 398 at positions where the two oxygen-containing gas supply channels 94a are merged together, around the fuel gas inlet 58 (see FIG. 28).

The separator 382 is formed by joining the first plate 384 and the second plate 386 together by, for example, brazing, laser welding or diffusion bonding, and includes four sandwiching sections 364 each having a circular disk shape, four bridges 366 connected to the respective sandwiching sections 364, and a single reactant gas supply section 368 connected to the bridges 366. The separator 382 includes an extension 400 extending from the outer circumferential portion of each of at least one of the sandwiching sections 364 for collecting electrical energy generated in the four electrolyte electrode assemblies 36 (i.e., the fuel cell 380).

In the fuel cell 380, the fuel gas flows along the fuel gas supply passage 46 in the stacking direction indicated by the arrow A. The fuel gas moves along the fuel gas supply channel 86a of each fuel cell 380 in the direction in which the surface of the separator 382 extends. The fuel gas flows from the fuel gas supply channel 86a into the fuel gas channel 54 through the fuel gas inlet 58 formed in the sandwiching section 364. The fuel gas flows along the fuel gas channel 54 toward the outer circumferential region of the anode 34.

The air supplied to the oxygen-containing gas supply passage 60 flows through the oxygen-containing gas supply channel 94a provided in each of the fuel cells 380, and moves in the direction in which the surface of the separator 382 extends. The air from the oxygen-containing gas supply channel 94a flows into the three oxygen-containing gas inlets 70 formed in the sandwiching section 364, and flows along the oxygen-containing gas channel 68 toward the outer circumferential region of the cathode 32.

In the seventh embodiment, the first projections 56 and the second projections 69 are arranged in a zigzag pattern in predetermined directions in each of the first and second sandwiching sections 392, 398 (plate 360), respectively. Therefore, the same advantages as in the case of the first to sixth embodiments are obtained. For example, strength against deformation of the separator 382 is improved, and IR losses are reduced to achieve improvement in the power generation efficiency.

Although certain preferred embodiments of the present invention have been shown and described in detail, it should be understood that various changes and modifications may be made therein without departing from the scope of the appended claims.

The invention claimed is:

1. A fuel cell formed by stacking electrolyte electrode assemblies and separators alternately, said electrolyte electrode assemblies each including an anode, a cathode, and an electrolyte interposed between said anode and said cathode, each of the separators including:
   a sandwiching section for sandwiching the electrolyte electrode assembly, the sandwiching section having a fuel gas channel for supplying a fuel gas along an electrode surface of the anode provided on one surface of the separator and an oxygen-containing gas channel for supplying an oxygen-containing gas along an electrode surface of the cathode provided on another surface of the separator, separately;
   a bridge connected to the sandwiching section, the bridge having a reactant gas supply channel for supplying the fuel gas to the fuel gas channel or supplying the oxygen-containing gas to the oxygen-containing gas channel; and
   a reactant gas supply section connected to the bridge, a reactant gas supply passage for supplying the fuel gas or the oxygen-containing gas to the reactant gas supply channel extending through the reactant gas supply section in a stacking direction, wherein
   in the sandwiching section, a plurality of projections are arranged in a zigzag pattern in a direction in which the bridge extends such that adjacent three projections are arranged at respective vertices of a virtual equilateral triangle;
   the projections include first projections protruding toward the fuel gas channel to contact the anode and second projections protruding toward the oxygen-containing gas channel to contact the cathode; and
   the number of the first projections and the second projections that are arranged at a same phase in the stacking direction is larger than the number of the first projections and the second projections that are arranged in different phases in the stacking direction,
   wherein:
      each of the separators are formed of a plurality of plates wherein at least one plate in at least one of the separators comprises the reactant gas supply passage and an oxygen-containing gas supply passage,
      the first projections and the second projections include projections that are arranged at the same phase and projections that are not arranged at the same phase in the stacking direction, and the projections are arranged in the zigzag pattern in a direction of a straight line connecting the center of the reactant gas supply section and the center of the sandwiching section.

2. A fuel cell according to claim 1, wherein the projections are arranged in the zigzag pattern in a direction in which the reactant gas supply channel extends.

3. A fuel cell according to claim 1, wherein the projections are arranged in the zigzag pattern in a direction of a straight line connecting the center of the reactant gas supply section and the center of gravity of the sandwiching section.

4. A fuel cell according to claim 1, wherein the fuel cell is a solid oxide fuel cell.

5. A fuel cell formed by stacking electrolyte electrode assemblies and separators alternately, said electrolyte electrode assemblies each including an anode, a cathode, and an electrolyte interposed between said anode and said cathode, each of the separators including:
- a sandwiching section for sandwiching the electrolyte electrode assembly, the sandwiching section having a fuel gas channel for supplying a fuel gas along an electrode surface of the anode provided on one surface of the separator and an oxygen-containing gas channel for supplying an oxygen-containing gas along an electrode surface of the cathode provided on another surface of the separator, separately;
- a bridge connected to the sandwiching section, the bridge having a reactant gas supply channel for supplying the fuel gas to the fuel gas channel or supplying the oxygen-containing gas to the oxygen-containing gas channel; and
- a reactant gas supply section connected to the bridge, a reactant gas supply passage for supplying the fuel gas or the oxygen-containing gas to the reactant gas supply channel extending through the reactant gas supply section in a stacking direction, wherein
- in the sandwiching section, a plurality of projections are arranged in a zigzag pattern in a direction in which the reactant gas supply channel extends such that adjacent three projections are arranged at respective vertices of a virtual equilateral triangle;
- the projections include first projections protruding toward the fuel gas channel to contact the anode and second projections protruding toward the oxygen-containing gas channel to contact the cathode; and
- the number of the first projections and the second projections that are arranged at a same phase in the stacking direction is larger than the number of the first projections and the second projections that are arranged in different phases in the stacking direction, wherein:
- each of the separators are formed of a plurality of plates wherein at least one plate in at least one of the separators comprises the reactant gas supply passage and an oxygen-containing gas supply passage,
- the first projections and the second projections include projections that are arranged at the same phase and projections that are not arranged at the same phase in the stacking direction, and
- the projections are arranged in the zigzag pattern in a direction of a straight line connecting the center of the reactant gas supply section and the center of the sandwiching section.

6. A fuel cell according to claim 5, wherein the projections are arranged in the zigzag pattern in a direction of a straight line connecting the center of the reactant gas supply section and the center of gravity of the sandwiching section.

7. A fuel cell according to claim 5, wherein the fuel cell is a solid oxide fuel cell.

8. A fuel cell formed by stacking electrolyte electrode assemblies and separators alternately, said electrolyte electrode assemblies each including an anode, a cathode, and an electrolyte interposed between said anode and said cathode, each of the separators including:
- a sandwiching section for sandwiching the electrolyte electrode assembly, the sandwiching section having a fuel gas channel for supplying a fuel gas along an electrode surface of the anode provided on one surface of the separator and an oxygen-containing gas channel for supplying an oxygen-containing gas along an electrode surface of the cathode provided on another surface of the separator, separately;
- a bridge connected to the sandwiching section, the bridge having a reactant gas supply channel for supplying the fuel gas to the fuel gas channel or supplying the oxygen-containing gas to the oxygen-containing gas channel; and
- a reactant gas supply section connected to the bridge, a reactant gas supply passage for supplying the fuel gas or the oxygen-containing gas to the reactant gas supply channel extending through the reactant gas supply section in a stacking direction, wherein
- in the sandwiching section, a plurality of projections are arranged in a zigzag pattern in a direction of a straight line connecting the center of the reactant gas supply section and the center of gravity of the sandwiching section such that adjacent three projections are arranged at respective vertices of a virtual equilateral triangle;
- the projections include first projections protruding toward the fuel gas channel to contact the anode and second projections protruding toward the oxygen-containing gas channel to contact the cathode; and
- the number of the first projections and the second projections that are arranged at a same phase in the stacking direction is larger than the number of the first projections and the second projections that are arranged in different phases in the stacking direction, wherein:
- each of the separators are formed of a plurality of plates wherein at least one plate in at least one of the separators comprises the reactant gas supply passage and an oxygen-containing gas supply passage,
- the first projections and the second projections include projections that are arranged at the same phase and projections that are not arranged at the same phase in the stacking direction, and
- the projections are arranged in the zigzag pattern in a direction of a straight line connecting the center of the reactant gas supply section and the center of the sandwiching section.

9. A fuel cell according to claim 8, wherein the fuel cell is a solid oxide fuel cell.

* * * * *